(12) United States Patent
Watanabe et al.

(10) Patent No.: US 12,471,946 B2
(45) Date of Patent: Nov. 18, 2025

(54) TREATMENT SYSTEM, CONTROL DEVICE, AND METHOD OF OPERATING THE TREATMENT SYSTEM

(71) Applicant: OLYMPUS CORPORATION, Hachioji (JP)

(72) Inventors: Koichiro Watanabe, Higashiyamato (JP); Kazuma Terayama, Hanno (JP); Tsuyoshi Yaji, Kawagoe (JP); Misato Kobayashi, Tachikawa (JP)

(73) Assignee: OLYMPUS CORPORATION, Tokyo (JP)

( * ) Notice: Subject to any disclaimer, the term of this patent is extended or adjusted under 35 U.S.C. 154(b) by 294 days.

(21) Appl. No.: 18/243,843

(22) Filed: Sep. 8, 2023

(65) Prior Publication Data

US 2023/0414242 A1    Dec. 28, 2023

Related U.S. Application Data

(63) Continuation of application No. PCT/JP2022/009250, filed on Mar. 3, 2022.

(60) Provisional application No. 63/159,104, filed on Mar. 10, 2021.

(51) Int. Cl.
*A61B 17/32* (2006.01)
*A61B 1/00* (2006.01)
*A61B 17/00* (2006.01)

(52) U.S. Cl.
CPC ........... *A61B 17/320068* (2013.01); *A61B 1/000094* (2022.02); *A61B 1/00045* (2013.01); *A61B 2017/00022* (2013.01); *A61B 2017/00973* (2013.01); *A61B 2017/320069* (2017.08)

(58) Field of Classification Search
CPC ...... A61B 17/320068; A61B 1/000094; A61B 1/00045; A61B 2017/00022; A61B 2017/00973; A61B 2017/320069; A61B 1/0638; A61B 1/317; A61B 2017/00017; A61B 2017/00128; A61B 90/30; A61B 2017/00221; A61B 2017/320078; A61B 2217/005; A61B 2217/007; A61B 17/16;
(Continued)

(56) References Cited

U.S. PATENT DOCUMENTS

2010/0191173 A1   7/2010 Kimura et al.
2018/0000505 A1*  1/2018 Onuma ................. A61B 17/16
(Continued)

FOREIGN PATENT DOCUMENTS

JP    2010-082287 A    4/2010
WO   2010/087060 A1   8/2010
(Continued)

OTHER PUBLICATIONS

May 10, 2022 International Search Report issued in International Patent Application No. PCT/JP2022/009250.

*Primary Examiner* — Amit Chatly
(74) *Attorney, Agent, or Firm* — Oliff PLC

(57) ABSTRACT

A treatment system includes: a treatment instrument for cutting living tissue in a liquid; and a controller for performing control, prior to cutting the living tissue with the treatment instrument, to suppress reduced visibility of a treatment area due to turbidity in the liquid caused by the cutting of the living tissue based on preparation information regarding cutting preparation for the treatment instrument.

22 Claims, 19 Drawing Sheets

(58) Field of Classification Search
CPC ............ A61M 2205/3584; A61M 1/77; H01H 2225/018; H01H 3/14
See application file for complete search history.

(56) References Cited

U.S. PATENT DOCUMENTS

2018/0177390 A1* 6/2018 Iannitti .................. A61B 34/20
2019/0247077 A1* 8/2019 Fujisaki ............. A61B 17/1675

FOREIGN PATENT DOCUMENTS

WO 2016/171014 A1 10/2016
WO 2018/078830 A1 5/2018

* cited by examiner

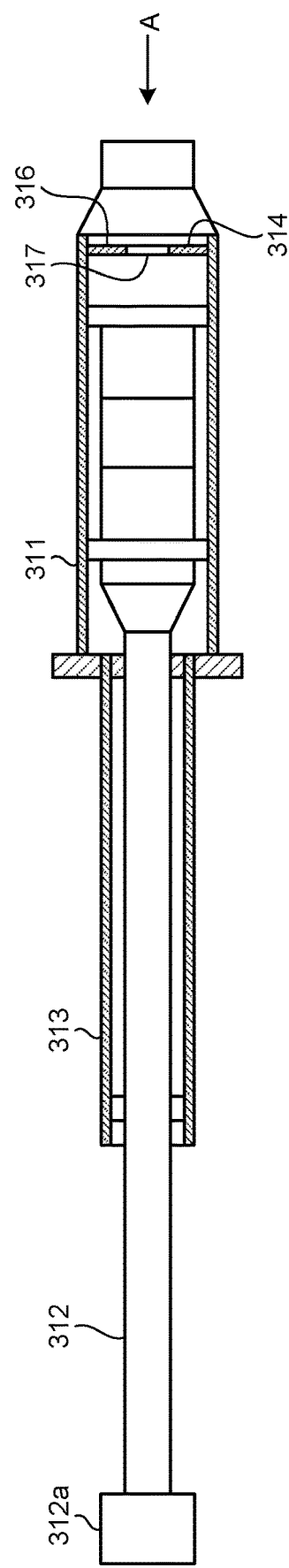

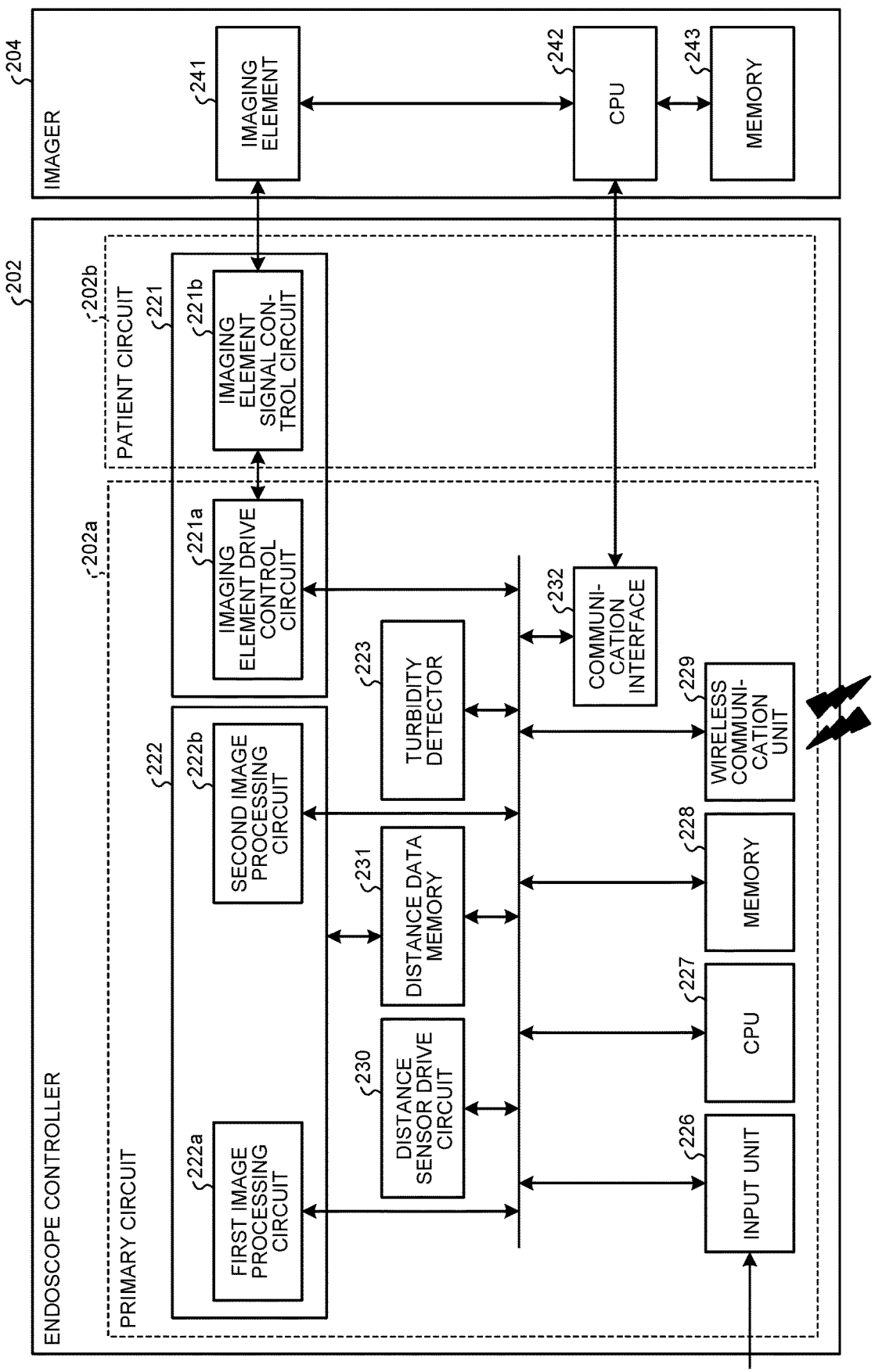

TREATMENT SYSTEM, CONTROL DEVICE, AND METHOD OF OPERATING THE TREATMENT SYSTEM

CROSS-REFERENCE TO RELATED APPLICATION

This application is a continuation of PCT International Application No. PCT/JP2022/009250 filed on Mar. 3, 2022 which is based on and claims priority under 35 U.S.C. § 119 to U.S. Provisional Application No. 63/159,104 filed on Mar. 10, 2021, the entire contents of which are incorporated herein by reference.

BACKGROUND

1. Technical Field

The present disclosure relates to a treatment system, a control device, and a method of operating the treatment system.

2. Related Art

Arthroscopic surgery is surgery in which a portal is formed in a joint to be treated, an arthroscope or a treatment instrument is inserted from the portal into the joint to be treated, and a treatment is performed while observing an inside of a joint cavity using the arthroscope in a situation where the joint cavity is filled with a perfusate. The arthroscopic surgery is performed using an arthroscopic surgery system. An ultrasound treatment instrument may also be used for forming a hole in a bone. The ultrasound treatment instrument is configured such that a distal end of the treatment instrument ultrasonically vibrates. In the arthroscopic surgery, the distal end of the treatment instrument pulverizes (cuts) a bone by ultrasonic vibration, and a hole (bone hole) is formed in the bone. Thereafter, the two bone holes are connected to form one bone hole.

SUMMARY

In some embodiments, a treatment system includes: a treatment instrument for cutting living tissue in a liquid; and a controller configured to perform control, prior to cutting the living tissue with the treatment instrument, to suppress reduced visibility of a treatment area due to turbidity in the liquid caused by the cutting of the living tissue based on preparation information regarding cutting preparation for the treatment instrument.

In some embodiments, a control device includes a controller configured to perform control, prior to cutting living tissue in a liquid using a treatment instrument, to suppress reduced visibility of a treatment area due to turbidity in the liquid caused by the cutting of the living tissue based on preparation information regarding cutting preparation for the treatment instrument.

In some embodiments, provided is a method of operating a treatment system. The treatment system includes a treatment instrument for cutting a living tissue in a liquid, and a controller. The method includes: performing control, by the controller, prior to cutting the living tissue with the treatment instrument, to suppress reduced visibility of a treatment area due to turbidity in the liquid caused by the cutting of the living tissue based on preparation information regarding cutting preparation for the treatment instrument.

The above and other features, advantages and technical and industrial significance of this disclosure will be better understood by reading the following detailed description of presently preferred embodiments of the disclosure, when considered in connection with the accompanying drawings.

BRIEF DESCRIPTION OF THE DRAWINGS

FIG. 3A is a schematic view illustrating a schematic configuration of an ultrasound probe;

FIG. 5 is a block diagram illustrating a functional configuration of an endoscope device;

DETAILED DESCRIPTION

Hereinafter, modes for carrying out the disclosure (hereinafter, referred to as embodiments) will be described with reference to the drawings. Note that the disclosure is not limited to the embodiments described below. Further, in the description of the drawings, the same parts are denoted by the same reference signs.

Schematic Configuration of Treatment System

Figure 1:
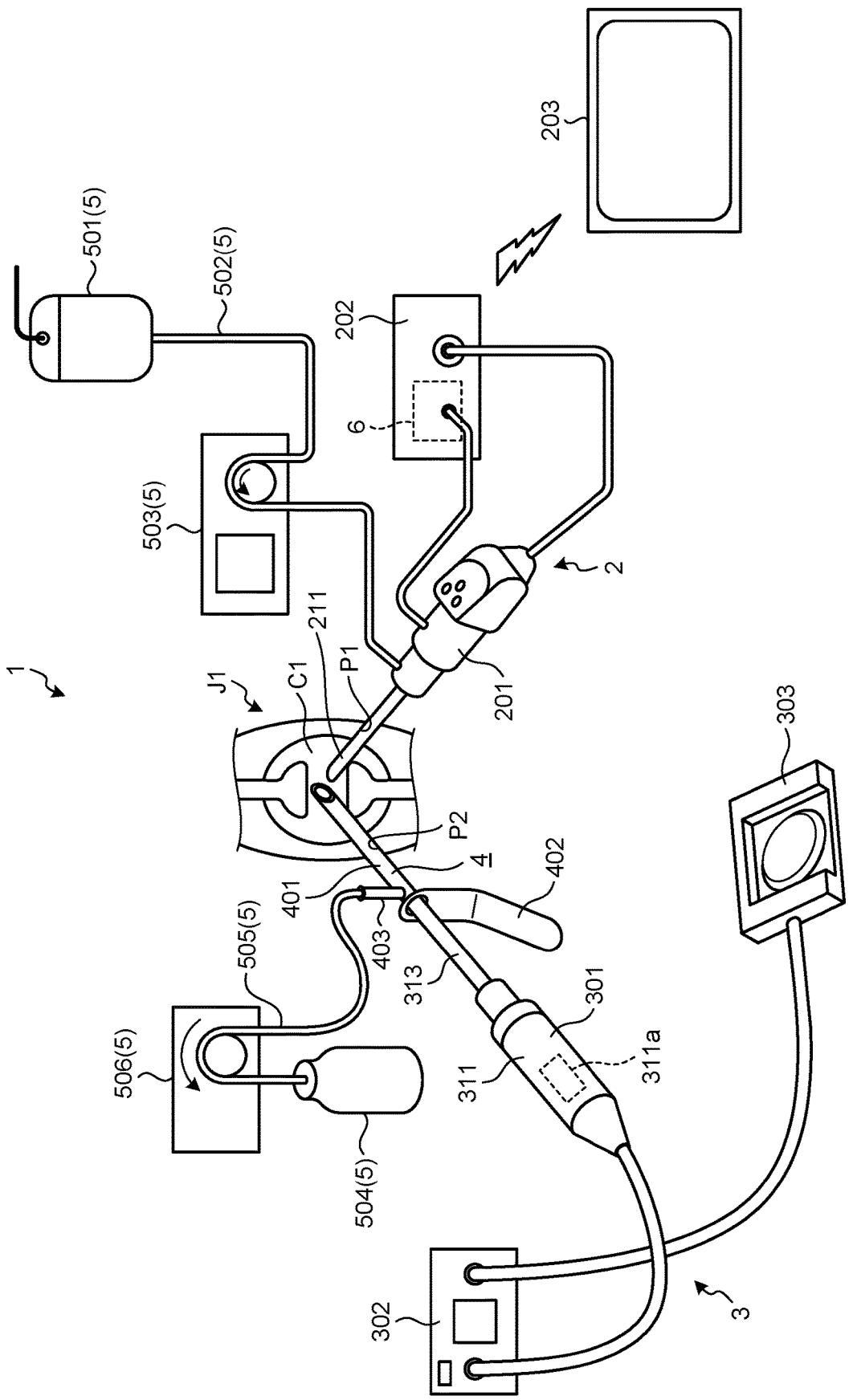
FIG. 1 is a diagram illustrating a schematic configuration of a treatment system according to an embodiment.

FIG. 1 is a diagram illustrating a schematic configuration of a treatment system 1 according to an embodiment.

The treatment system 1 performs treatment on living tissue such as a bone by applying ultrasonic vibration to the living tissue. Here, the treatment means, for example, removal or cutting of living tissue such as a bone. Incidentally, FIG. 1 illustrates, as the treatment system 1, a treatment system that performs anterior cruciate ligament reconstructive surgery. The treatment system 1 includes an endoscope device 2, a treatment device 3, a guiding device 4, a perfusion device 5, and an illumination device 6.

The endoscope device 2 includes an endoscope 201, an endoscope controller 202, and a display 203.

In the endoscope 201, a distal end portion of an insertion section 211 is inserted into a joint cavity C1 of a knee joint J1 through a first portal P1 through which an inside of the joint cavity C1 and an outside of skin communicate with each other. Then, the endoscope 201 captures illumination light that is applied to the inside of the joint cavity C1 and is reflected inside the joint cavity C1 (subject image), and captures the subject image.

The endoscope controller 202 performs various types of image processing on the image captured by the endoscope 201, and displays, on the display 203, the captured image that has been subjected to the image processing. The endoscope controller 202 is connected to the endoscope 201 and the display 203 in a wired or wireless manner.

The display 203 receives, via the endoscope controller 202, data, image data, audio data, and the like transmitted from each device of the treatment system, and displays/notifies the received data. The display 203 is configured using a liquid crystal display panel or an organic electroluminescence (EL) display panel.

The treatment device 3 includes a treatment instrument 301, a treatment instrument controller 302, and a foot switch 303.

The treatment instrument 301 includes a treatment instrument body 311, an ultrasound probe 312 (see FIG. 2), and a sheath 313.

The treatment instrument body 311 is formed in a cylindrical shape. Then, an ultrasound transducer 311a (FIG. 1) is housed in the treatment instrument body 311. The ultrasound transducer 311a is configured by a bolt-clamped Langevin-type transducer and configured to generate ultrasonic vibration according to driving power supplied.

The treatment instrument controller 302 supplies the driving power to the ultrasound transducer 311a in accordance with operation on the foot switch 303 by a surgeon.

Note that the supply of the driving power is not limited to the operation on the foot switch 303, and the supply of the drive power may be performed, for example, in accordance with operation on an operating unit (not illustrated) provided in the treatment instrument 301.

The foot switch 303 is an input interface for the surgeon to operate with his/her foot when the surgeon drives the ultrasound probe 312.

The guiding device 4, the perfusion device 5, and the illumination device 6 will be described later.

Figure 2:
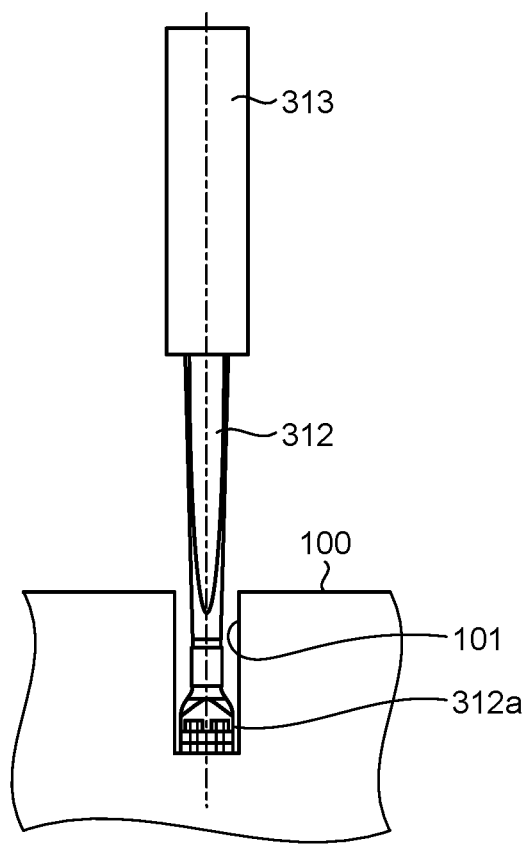
FIG. 2 is a diagram illustrating how to form a bone hole with an ultrasound probe.
Figure 3B:
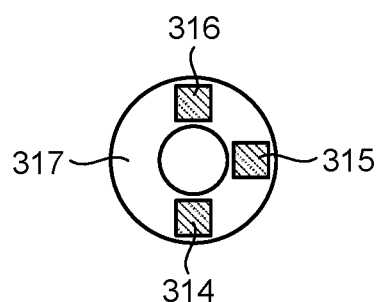
FIG. 3B is a schematic view in a direction of arrow A in FIG. 3A.

FIG. 2 is a diagram illustrating how to form a bone hole 101 with the ultrasound probe 312. FIG. 3A is a schematic view illustrating a schematic configuration of the ultrasound probe 312. FIG. 3B is a schematic view in a direction of arrow A in FIG. 3A.

The ultrasound probe 312 is made of, for example, titanium alloy or the like, and has a substantially cylindrical shape. A proximal end portion of the ultrasound probe 312 is connected to the ultrasound transducer 311a in the treatment instrument body 311. Then, the ultrasound probe 312 transmits the ultrasonic vibration generated by the ultrasound transducer 311a from the proximal end to the distal end. In the present embodiment, the ultrasonic vibration is longitudinal vibration along the longitudinal direction (up-down direction in FIG. 2) of the ultrasound probe 312. As illustrated in FIG. 2, the ultrasound probe 312 has, at the distal end portion, a distal end treatment section 312a.

The sheath 313 is formed in a cylindrical shape longer than the treatment instrument body 311 and covers a part of the outer periphery of the ultrasound probe 312 from the treatment instrument body 311 to an arbitrary length.

The distal end portion of the ultrasound probe 312 in the treatment instrument 301 described above is inserted into the joint cavity C1 while being guided by the guiding device 4 inserted into the joint cavity C1 through a second portal P2 through which the inside of the joint cavity C1 and the outside of the skin communicate with each other.

Then, when ultrasonic vibration is generated in a state where the distal end treatment section 312a is in contact with a treatment target region 100 of the bone, a part of the bone mechanically colliding with the distal end treatment section 312a is pulverized into fine particles by the hammering action (see FIG. 2). Then, in response to the surgeon pushing the distal end treatment section 312a against the treatment target region 100, the distal end treatment section 312a moves forward into the treatment target region 100 while pulverizing the bone. As a result, the bone hole 101 is formed in the treatment target region 100.

At the proximal end of the treatment instrument body 311, an annular circuit board 317 on which a posture detector 314, a central processing unit (CPU) 315, and a memory 316 are mounted is provided (see FIGS. 3A and 3B).

The posture detector 314 includes a sensor that detects rotation and movement of the treatment instrument 301.

The posture detector 314 detects movement in three axial directions that are orthogonal to one another and include an axis parallel to the longitudinal axis of the ultrasound probe 312 and rotation around each axis. The posture detector 314 includes, for example, a triaxial angular velocity sensor (gyro sensor), an acceleration sensor, and the like.

If the detection result of the posture detector 314 does not change for a certain period of time, then the treatment instrument controller 302 determines that the treatment instrument 301 is stationary.

The CPU 315 corresponds to a control unit that controls the operation of the posture detector 314 and transmits and receives information to and from the treatment instrument controller 302.

In FIG. 1, the guiding device 4 is inserted into the joint cavity C1 through the second portal P2 and guides insertion of the distal end portion of the ultrasound probe 312 of the treatment instrument 301 into the joint cavity C1.

The guiding device 4 includes a guide body 401, a handle section 402, and a liquid discharge section 403 with a cock.

The guide body 401 has a tubular shape having a through hole through which the ultrasound probe 312 is inserted (see FIG. 1).

The guide body 401 restricts the travel of the ultrasound probe 312 inserted into the through hole in a certain direction and guides the movement of the ultrasound probe 312. In the present embodiment, a cross-sectional shape orthogonal to the central axis on the outer peripheral surface and the inner peripheral surface of the guide body 401 is substantially circular. The distal end surface of the guide body 401 includes an aperture formed by a slope that obliquely intersects the central axis.

The liquid discharge section 403 with a cock is provided on the outer peripheral surface of the guide body 401 and has a cylindrical shape communicating with the inside of the guide body 401. One end of a liquid discharge tube 505 of the perfusion device 5 is connected to the liquid discharge section 403 with a cock, which forms a flow path that communicates the guide body 401 with the liquid discharge tube 505 of the perfusion device 5. The flow path is configured to open and close in response to an operation of a cock (not illustrated) provided in the liquid discharge section 403 with a cock.

The perfusion device 5 delivers a perfusate such as a sterilized physiological salt solution into the joint cavity C1 and discharges the perfusate to the outside of the joint cavity C1. The perfusion device 5 includes a liquid source 501, a liquid feed tube 502, a liquid feed pump 503, a liquid discharge bottle 504, a liquid discharge tube 505, and a liquid discharge pump 506 (see FIG. 1).

The liquid source 501 stores a perfusate.

The liquid feed tube 502 has one end connected to the liquid source 501 and the other end connected to the endoscope 201.

The liquid feed pump 503 feeds out the perfusate from the liquid source 501 toward the endoscope 201 through the liquid feed tube 502.

Then, the perfusate fed out to the endoscope 201 is sent into the joint cavity C1 from a liquid feed hole formed at the distal end portion of the insertion section 211.

The liquid discharge bottle 504 stores the perfusate discharged to the outside of the joint cavity C1.

The liquid discharge tube 505 has one end connected to the guiding device 4 and the other end connected to the liquid discharge bottle 504.

The liquid discharge pump 506 follows the flow path of the liquid discharge tube 505 from the guiding device 4 inserted into the joint cavity C1, and discharges the perfusate in the joint cavity C1 to the liquid discharge bottle 504.

In the present embodiment, the description will be given of the case using the liquid discharge pump 506, but the disclosure is not limited thereto, and a suction device provided in a facility may be used.

The illumination device 6 includes two light sources that respectively emit two illumination beams having different wavelength bands. The two illumination beams are, for example, white light and special light.

The illumination beam from the illumination device 6 is propagated to the endoscope 201 via a light guide and emitted from the distal end of the endoscope 201.

Functional Configuration of Entire Treatment System

Figure 4:
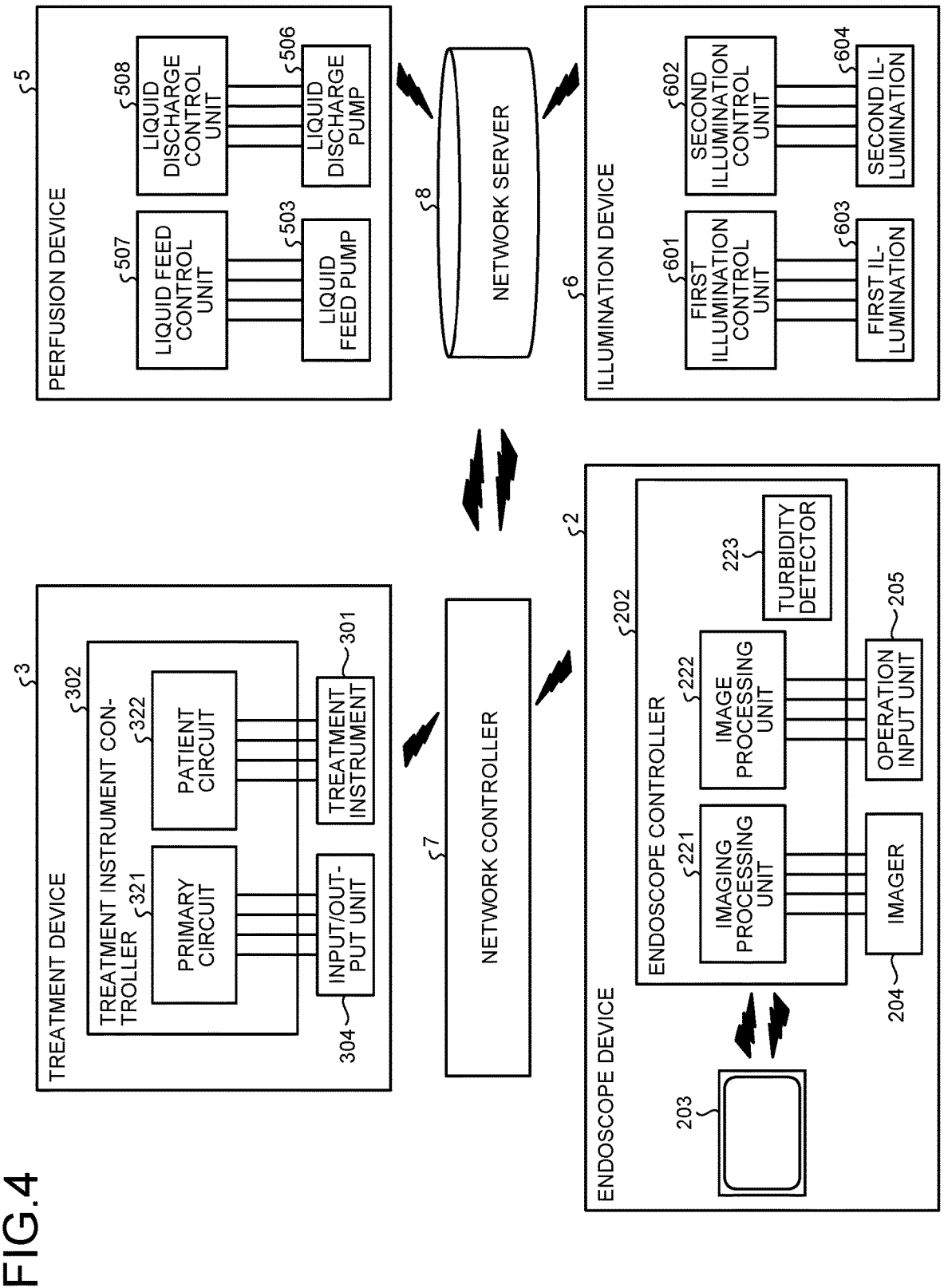
FIG. 4 is a block diagram illustrating an outline of a functional configuration of the treatment system according to an embodiment.

FIG. 4 is a block diagram illustrating an outline of a functional configuration of the entire treatment system.

The treatment system 1 further includes a network controller 7 that controls communication of the entire system and a network server 8 that stores various data.

The network controller 7 is communicably connected to the endoscope device 2, the treatment device 3, the perfusion device 5, the illumination device 6, and the network server 8.

Although FIG. 4 illustrates a case where the devices are wirelessly connected to each other, the devices may be connected to each other by wire.

Hereinafter, the detailed functional configurations of the endoscope device 2, the treatment device 3, the perfusion device 5, and the illumination device 6 will be described.

Functional Configuration of Endoscope Device

The endoscope device 2 includes the endoscope controller 202, the display 203, an imager 204, and an operation input unit 205 (see FIGS. 4 and 5).

The endoscope controller 202 includes an imaging processing unit 221, an image processing unit 222, a turbidity detector 223, an input unit 226, a central processing unit (CPU) 227, a memory 228, a wireless communication unit 229, a distance sensor drive circuit 230, a distance data memory 231, and a communication interface 232.

The imaging processing unit 221 includes an imaging element drive control circuit 221a that drives and controls an imaging element 241 of the imager 204, and an imaging element signal control circuit 221b that is provided in a patient circuit 202b electrically insulated from a primary circuit 202a to perform signal control of an imaging element 224a. The imaging element drive control circuit 221a is provided in the primary circuit 202a. Further, the imaging element signal control circuit 221b is provided in the patient circuit 202b electrically insulated from the primary circuit 202a.

The image processing unit 222 includes a first image processing circuit 222a that performs imaging processing and a second image processing circuit 222b that performs image editing processing.

The turbidity detector 223 detects turbidity based on information regarding turbidity in the endoscope device 2. Here, the information regarding turbidity is, for example, a value obtained from imaging data generated by the endoscope 201, a physical property value of the perfusate, impedance acquired from the treatment device 3, and the like.

Figure 6A:
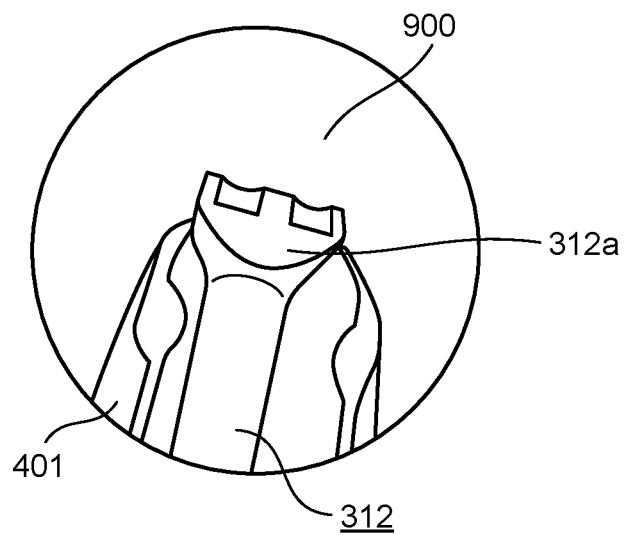
FIG. 6A is a diagram schematically illustrating a state in which a field of view of an endoscope is good when a bone hole is formed in a lateral femoral condyle.
Figure 6B:
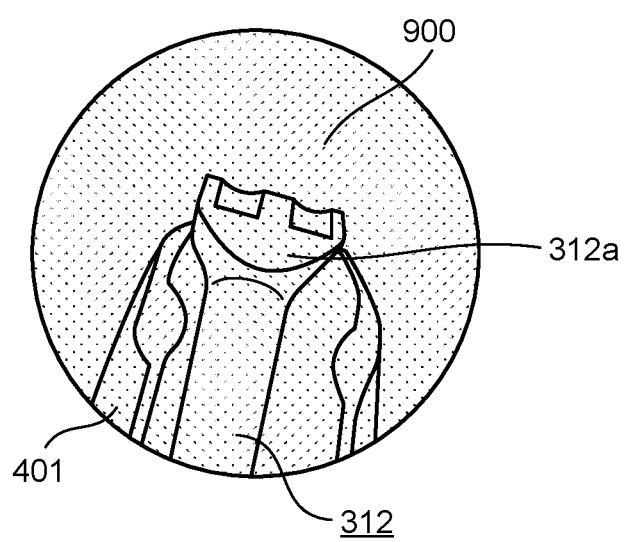
FIG. 6B is a diagram schematically illustrating a state in which a field of view of an endoscope is not good when a bone hole is formed in a lateral femoral condyle.

Here, FIGS. 6A and 6B are diagrams illustrating a state in which a field of view of the endoscope 201 is good and a state in which a field of view thereof is poor, respectively, and are diagrams schematically illustrating a field of view for a case where the surgeon forms a bone hole with respect to a lateral femoral condyle 900. Among these diagrams, FIG. 6B schematically illustrates a state in which the field of view is cloudy due to a bone pulverized into fine particles by the driving of the ultrasound probe 312.

In FIG. 6B, fine bones are represented by dots.

In FIG. 5, the input unit 226 receives an input of a signal input by the operation input unit 205.

The CPU 227 has control over the operation of the endoscope controller 202. The CPU 227 corresponds to a control unit that executes a program stored in the memory 228 to control the operation of each unit of the endoscope controller 202.

The memory 228 stores various types of information necessary for the operation of the endoscope controller 202, image data captured by the imager 204, and the like.

The wireless communication unit 229 is an interface for performing wireless communication with other devices.

The distance sensor drive circuit 230 drives a distance sensor that measures a distance to a predetermined target object in an image captured by the imager 204.

The distance data memory 231 stores distance data detected by the distance sensor.

The communication interface 232 is an interface for communicating with the imager 204.

In the above-described configuration, components other than the imaging element signal control circuit 221b are provided in the primary circuit 202a, and are mutually connected by bus wiring.

The imager 204 includes the imaging element 241, a CPU 242, and a memory 243.

The imaging element 241 is configured using a charge coupled device (CCD) or a complementary metal oxide semiconductor (CMOS).

The CPU 242 has control over the operation of the imager 204. The CPU 242 corresponds to a control unit that executes a program stored in the memory 243 to control the operation of each unit of the imager 204.

The memory 243 stores various types of information necessary for the operation of the imager 204, image data, and the like.

In FIG. 4, the operation input unit 205 is configured using an input interface such as a mouse, a keyboard, a touch panel, or a microphone, and receives an operation input of the endoscope device 2 by the surgeon.

Functional Configuration of Treatment Device

Figure 7:
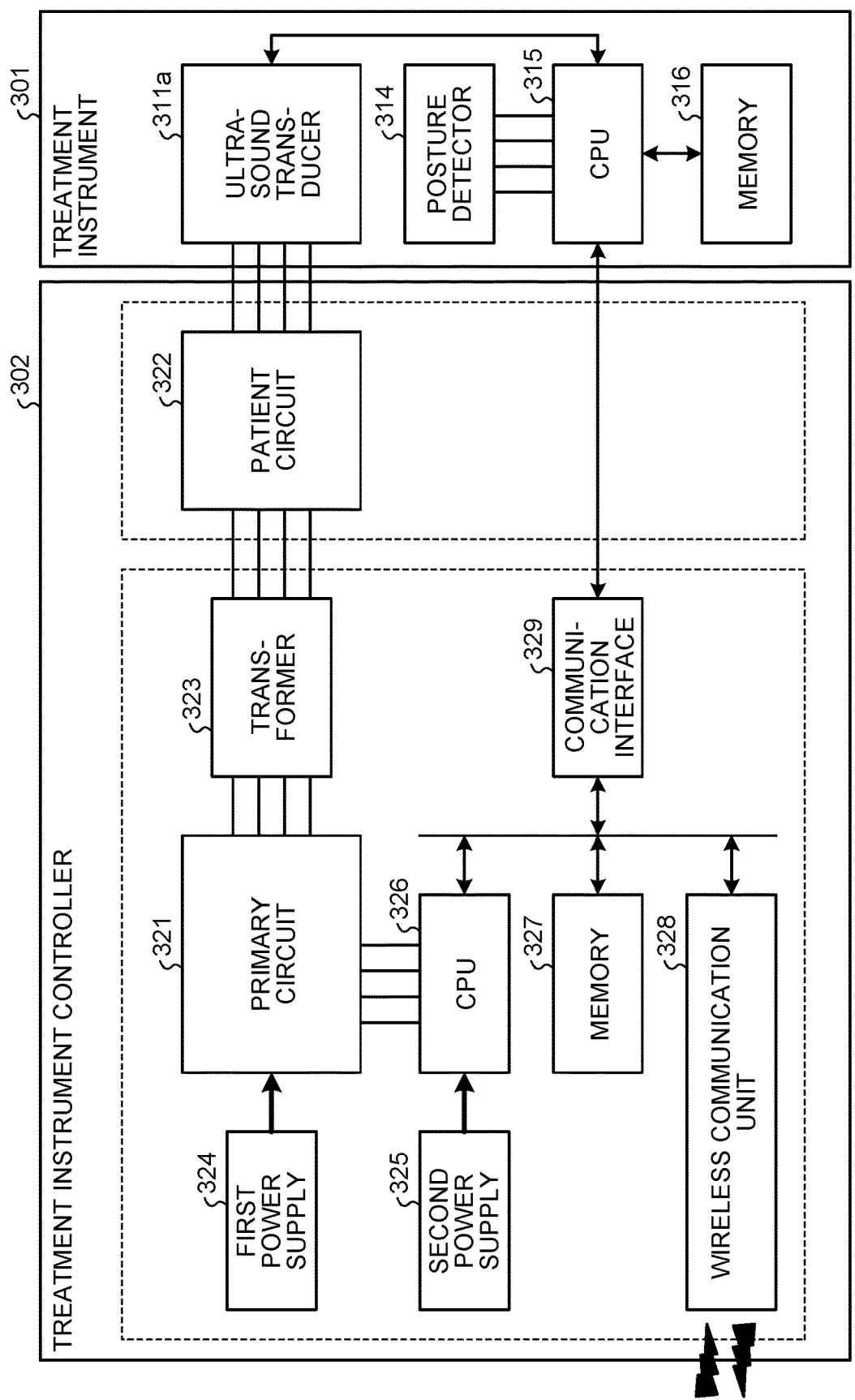
FIG. 7 is a block diagram illustrating a functional configuration of a treatment device.

The treatment device 3 includes the treatment instrument 301, the treatment instrument controller 302, and an input/output unit 304 (see FIGS. 4 and 7).

As illustrated in FIG. 7, the treatment instrument 301 includes the ultrasound transducer 311a, the posture detector 314, the CPU 315, and the memory 316.

The posture detector 314 includes an acceleration sensor and/or an angular velocity sensor, and detects the posture of the treatment instrument 301.

The CPU 315 has control over the operation of the treatment instrument 301 including the ultrasound transducer 311a. The CPU 315 corresponds to a control unit that executes a program stored in the memory 316 to control the operation of each unit of the treatment instrument 301.

The memory 316 stores various types of information necessary for the operation of the treatment instrument 301.

The treatment instrument controller 302 includes a primary circuit 321, a patient circuit 322, a transformer 323, a first power supply 324, a second power supply 325, a CPU 326, a memory 327, a wireless communication unit 328, and a communication interface 329.

The primary circuit 321 generates power to be supplied to the treatment instrument 301.

The patient circuit 322 is electrically isolated from the primary circuit 321.

The transformer 323 electromagnetically connects the primary circuit 321 and the patient circuit 322.

The first power supply 324 is a high-voltage power supply that supplies driving power for the treatment instrument 301.

The second power supply 325 is a low-voltage power supply that supplies driving power for a control circuit in the treatment instrument controller 302.

The CPU 326 has control over the operation of the treatment instrument controller 302. The CPU 326 corresponds to a control unit that executes a program stored in the memory 327 to control the operation of each unit of the treatment instrument controller 302.

The memory 327 stores various types of information necessary for the operation of the treatment instrument controller 302.

The wireless communication unit 328 is an interface for performing wireless communication with other devices.

The communication interface 329 is an interface for communicating with the treatment instrument 301.

In the meantime, the memory 327, the wireless communication unit 328, and the communication interface 329 constitute a preparation information acquisition section.

The input/output unit 304 is configured using an input interface such as a mouse, a keyboard, a touch panel, and a microphone and an output interface such as a monitor and a speaker, and outputs an operation input of the endoscope device 2 by the surgeon and various types of information to be notified to the surgeon (see FIG. 4).

Functional Configuration of Perfusion Device

Figure 8:
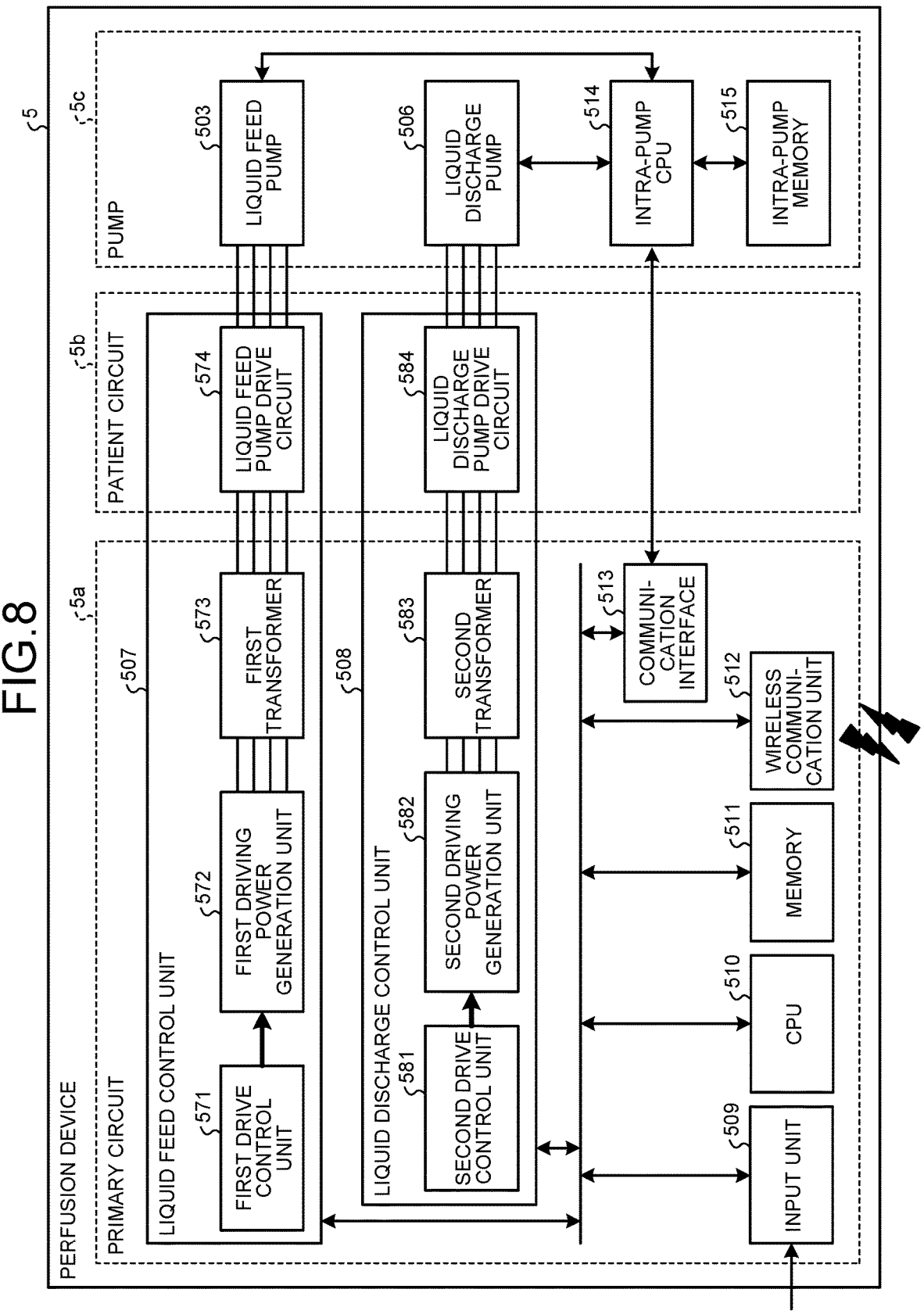
FIG. 8 is a block diagram illustrating a functional configuration of a perfusion device.

The perfusion device 5 includes the liquid feed pump 503, the liquid discharge pump 506, a liquid feed control unit 507, a liquid discharge control unit 508, an input unit 509, a CPU 510, a memory 511, a wireless communication unit 512, a communication interface 513, an intra-pump CPU 514, and an intra-pump memory 515 (see FIGS. 4 and 8).

In FIG. 8, the liquid feed control unit 507 includes a first drive control unit 571, a first driving power generation unit 572, a first transformer 573, and a liquid feed pump drive circuit 574.

The first drive control unit 571 controls the drive for the first driving power generation unit 572 and the liquid feed pump drive circuit 574.

The first driving power generation unit 572 generates driving power for the liquid feed pump 503.

The first transformer 573 electromagnetically connects the first driving power generation unit 572 and the liquid feed pump drive circuit 574.

The first drive control unit 571, the first driving power generation unit 572, and the first transformer 573 are provided in a primary circuit 5a. Further, the liquid feed pump drive circuit 574 is provided in a patient circuit 5b electrically insulated from the primary circuit 5a.

The liquid discharge control unit 508 includes a second drive control unit 581, a second driving power generation unit 582, a second transformer 583, and a liquid discharge pump drive circuit 584.

The second drive control unit 581 controls the drive for the second driving power generation unit 582 and the liquid discharge pump drive circuit 584.

The second driving power generation unit 582 generates driving power for the liquid discharge pump 506.

The second transformer 583 electromagnetically connects the second driving power generation unit 582 and the liquid discharge pump drive circuit 584.

The second drive control unit 581, the second driving power generation unit 582, and the second transformer 583 are provided in the primary circuit 5a. Further, the liquid discharge pump drive circuit 584 is provided in the patient circuit 5b.

The input unit 509 receives inputs of various signals such as an operation input (not illustrated).

The CPU 510 and the intra-pump CPU 514 cooperate to control over the operation of the perfusion device 5. The CPU 510 corresponds to a control unit that executes a program stored in the memory 511 to control the operation of each unit of the perfusion device 5 via a BUS line.

The memory 511 stores various types of information necessary for the operation of the perfusion device 5.

The wireless communication unit 512 is an interface for performing wireless communication with other devices.

The communication interface 513 is an interface for communicating with the imager 204.

The intra-pump memory 515 stores various types of information necessary for the operation of the liquid feed pump 503 and the liquid discharge pump 506.

The input unit 509, the CPU 510, the memory 511, the wireless communication unit 512, and the communication interface 513 are provided in the primary circuit 5*a*.

The intra-pump CPU 514 and the intra-pump memory 515 are provided in a pump 5*c*.

The intra-pump CPU 514 and the intra-pump memory 515 may be provided around the liquid feed pump 503 or may be provided around the liquid discharge pump 506.

Functional Configuration of Illumination Device

Figure 9:
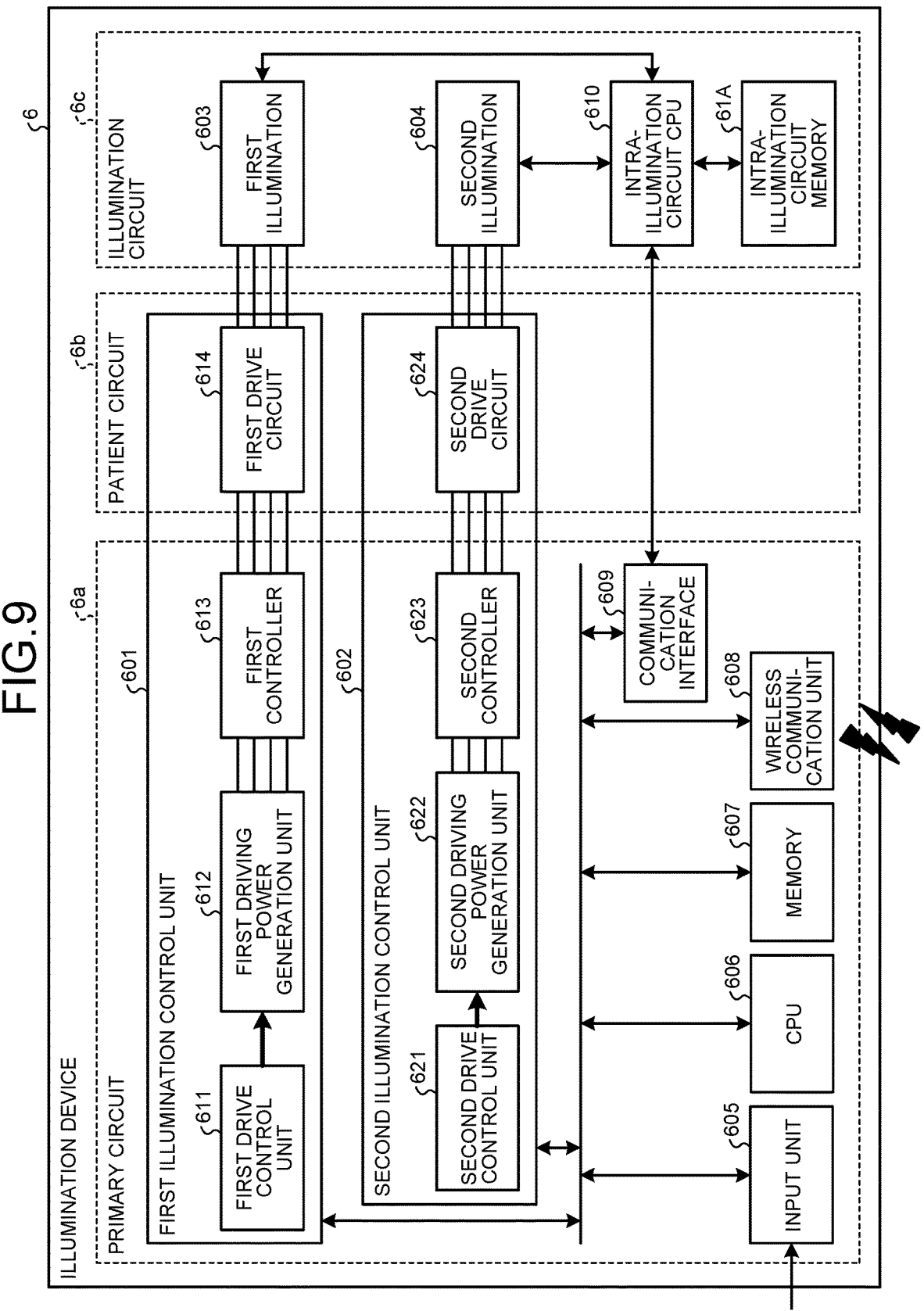
FIG. 9 is a block diagram illustrating a functional configuration of an illumination device.

The illumination device 6 includes a first illumination control unit 601, a second illumination control unit 602, first illumination 603, second illumination 604, an input unit 605, a CPU 606, a memory 607, a wireless communication unit 608, a communication interface 609, an intra-illumination circuit CPU 610, and an intra-illumination circuit memory 61A (see FIGS. 4 and 9).

The first illumination control unit 601 includes a first drive control unit 611, a first driving power generation unit 612, a first controller 613, and a first drive circuit 614.

The first drive control unit 611 controls the drive for the first driving power generation unit 612, the first controller 613, and the first drive circuit 614.

The first driving power generation unit 612 generates driving power for the first illumination 603.

The first controller 613 controls the light output of the first illumination 603.

The first drive circuit 614 drives the first illumination 603 to output illumination light.

The first drive control unit 611, the first driving power generation unit 612, and the first controller 613 are provided in a primary circuit 6*a*. Further, the first drive circuit 614 is provided in a patient circuit 6*b* electrically insulated from the primary circuit 6*a*.

The second illumination control unit 602 includes a second drive control unit 621, a second driving power generation unit 622, a second controller 623, and a second drive circuit 624.

The second drive control unit 621 controls the drive for the second driving power generation unit 622, the second controller 623, and the second drive circuit 624.

The second driving power generation unit 622 generates driving power for the second illumination 604.

The second controller 623 controls the light output of the second illumination 604.

The second drive circuit 624 drives the second illumination 604 to output illumination light.

The second drive control unit 621, the second driving power generation unit 622, and the second controller 623 are provided in the primary circuit 6*a*. The second drive circuit 624 is provided in the patient circuit 6*b*.

The input unit 605 receives inputs of various signals such as an operation input (not illustrated).

The CPU 606 and the intra-illumination circuit CPU 610 cooperate to control over the operation of the illumination device 6. The CPU 606 corresponds to a control unit that executes a program stored in the memory 607 to control the operation of each unit of the illumination device 6.

The memory 607 stores various types of information necessary for the operation of the illumination device 6.

The wireless communication unit 608 is an interface for performing wireless communication with other devices.

The communication interface 609 is an interface for communicating with an illumination circuit 6*c*.

The intra-illumination circuit memory 61A stores various types of information necessary for the operation of the first illumination 603 and the second illumination 604.

The input unit 605, the CPU 606, the memory 607, the wireless communication unit 608, and the communication interface 609 are provided in the primary circuit 6*a*.

The intra-illumination circuit CPU 610 and the intra-illumination circuit memory 61A are provided in the illumination circuit 6*c*.

Outline of Treatment

Figure 10:
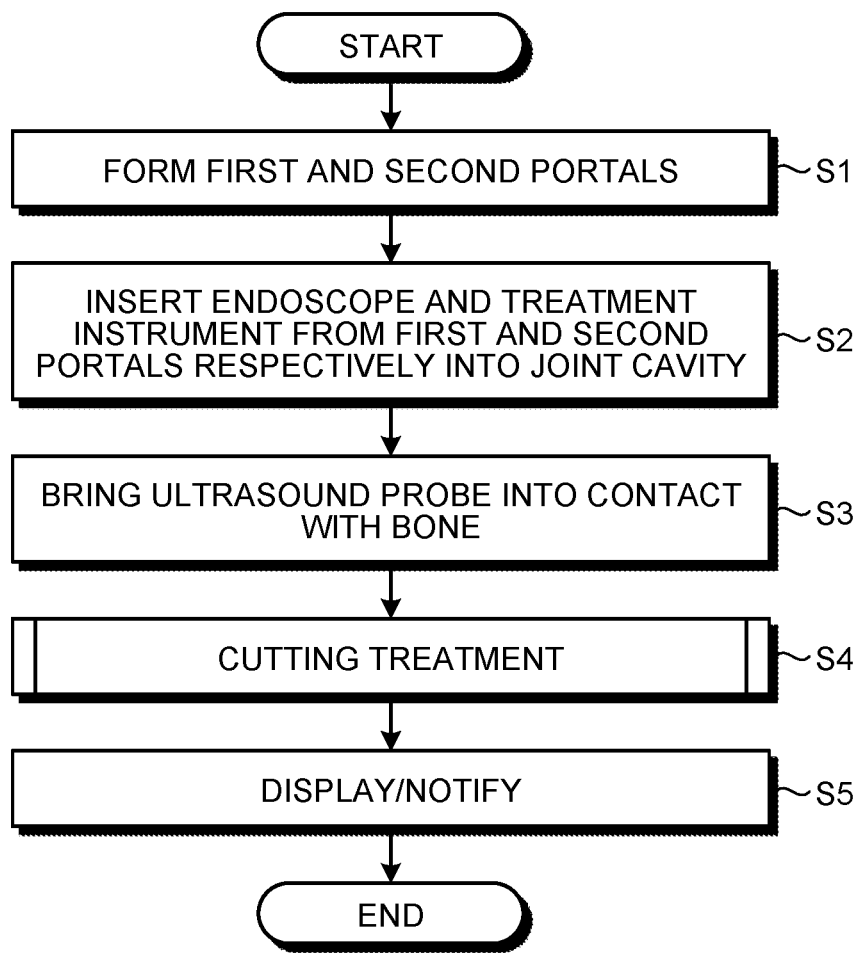
FIG. 10 is a flowchart illustrating an outline of treatment performed by a surgeon using the treatment system according to an embodiment.

FIG. 10 is a flowchart illustrating the outline of treatment performed by a surgeon using the treatment system 1.

The surgeon who performs the treatment may be one doctor or two or more doctors and assistants.

First, the surgeon forms a first portal P1 and a second portal P2 each of which communicates the inside of the joint cavity C1 of the knee joint J1 with the outside of the skin (Step S1).

Subsequently, the surgeon inserts the endoscope 201 into the joint cavity C1 from the first portal P1, inserts the guiding device 4 into the joint cavity C1 from the second portal P2, and inserts the treatment instrument 301 into the joint cavity C1 in accordance with a guide by the guiding device 4 (Step S2).

Here, the case where the two portals are formed first, and then the endoscope 201 and the treatment instrument 301 are inserted into the joint cavity C1 from each of the portals has been described. However, it is also possible that the first portal P1 is formed and the endoscope 201 is first inserted into the joint cavity C1, and then the second portal P2 is formed and the guiding device 4 and the treatment instrument 301 are inserted into the joint cavity C1.

Thereafter, the surgeon brings the ultrasound probe 312 into contact with a bone to be treated while visually checking an endoscopic image for the inside of the joint cavity C1 displayed on the display 203 (Step S3).

Subsequently, the surgeon performs cutting treatment using the treatment instrument 301 (Step S4). Details of the cutting treatment will be described later.

Thereafter, the display 203 displays the inside of the joint cavity C1 and performs processing of displaying/notifying information regarding the state after the cutting treatment (Step S5). The endoscope controller 202 is turned off, for example, after the display/notification processing.

Figure 11:
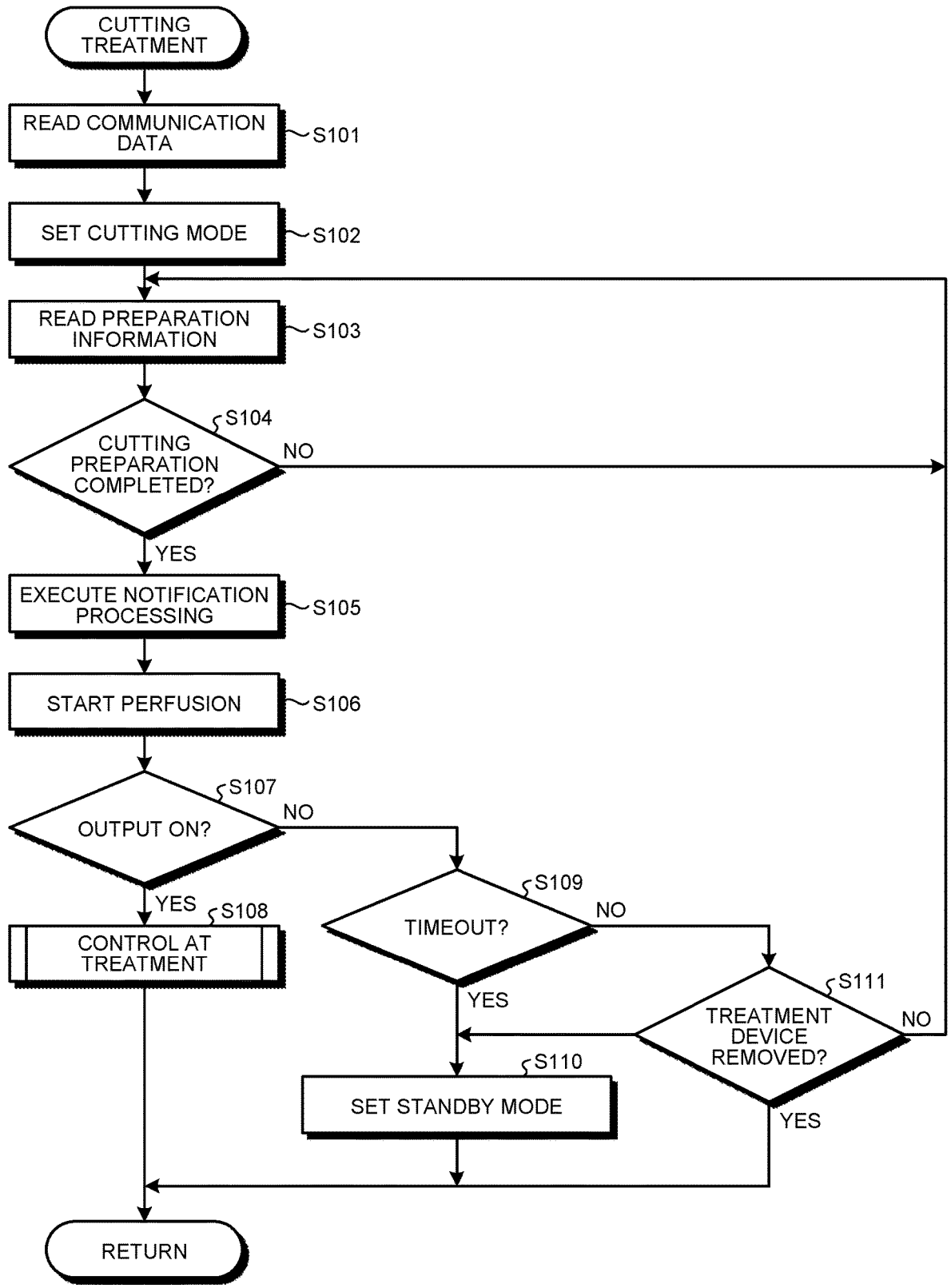
FIG. 11 is a flowchart illustrating an outline of cutting treatment in the treatment system according to an embodiment.

The description goes on to the cutting treatment with reference to FIGS. 11 to 14. FIG. 11 is a flowchart illustrating an outline of cutting treatment in the treatment system according to the present embodiment. The following describes a case where each processing is executed under the control of the CPU of each controller, but for example, any of the controllers such as the network controller 7 may collectively execute the processing.

The CPU 326 reads communication data (Step S101). The communication data herein is, for example, data required for performing communication with the treatment instrument 301 that is communicably connected to the treatment instrument controller 302.

The processing of reading the communication data does not need to be executed every time, and can be omitted if the communication data reading processing has been already executed.

Thereafter, the CPU 326 sets a mode of cutting to be executed by the treatment instrument 301 (Step S102). By setting the cutting mode, for example, a frequency of ultrasonic vibration suitable for cutting is set. The CPU 326 sets the cutting mode based on the input setting information.

After the cutting mode is set, the CPU 326 reads preparation information (Step S103). The preparation information is information based on whether the treatment instrument 301 is ready to perform cutting treatment. The preparation information in the present embodiment is information regarding the posture of the treatment instrument 301, and is detection results of the acceleration sensor and the angular velocity sensor at different times detected by the posture detector 314.

In the present embodiment, the detection results of the acceleration sensor and the angular velocity sensor are used, but the detection result of one of the acceleration sensor and the angular velocity sensor may be used.

The CPU 326 determines whether preparation for performing the cutting treatment is made based on the preparation information (Step S104). The CPU 326 determines whether there is a change in the posture of the treatment instrument 301 based on the detection results of the acceleration and the angular velocity acquired as the preparation information, and determines whether preparation for performing the cutting treatment is made based on the change. For example, if time change (for example, a vector amount) calculated from the acceleration and the angular velocity is equal to or less than a preset threshold (change amount), then the CPU 326 determines that preparation for the cutting treatment is made (cutting preparation completed) (Step S104: Yes), and the processing proceeds to Step S105. On the other hand, if the time change is greater than the threshold, then the CPU 326 determines that preparation for the cutting treatment is not made (Step S104: No), and the processing returns to Step S103 in which new preparation information is read.

The threshold used at this time is set based on a position change amount of the treatment instrument 301 in which the cutting position of the treatment instrument 301 is determined immediately before the treatment and a state in which the operation of the treatment instrument 301 is stopped is determined.

In Step S105, the CPU 326 executes processing of notifying that preparation for cutting has been made. For example, the CPU 326 transmits, to the wireless communication unit 328, communication data necessary for the display 203 to display information indicating that preparation for cutting has been made.

After the notification processing, the CPU 326 sends, to the wireless communication unit 328, communication data necessary for the perfusion device 5 to start a perfusion operation (Step S106). At this time, the perfusate released from the perfusion device 5 is, for example, to inflate a joint cavity (joint capsule) to secure the field of view of the endoscope device 2. The perfusion device 5 is driven to continuously release the perfusate. The release of the perfusate irrigates the treatment area (joint cavity C1, for example).

The CPU 326 determines whether the output of the treatment instrument 301 is on, that is, whether the treatment instrument 301 is in a state of being able to start ultrasonic vibration (Step S107). For example, the CPU 326 determines whether the output is on by checking the energization state of the treatment instrument 301. If the CPU 326 determines that the output of the treatment instrument 301 is on (Step S107: Yes), then the processing proceeds to Step S108. On the other hand, if the CPU 326 does not determine that the output of the treatment instrument 301 is on (Step S107: No), then the processing proceeds to Step S109.

In Step S108, the CPU 326 executes control at the time of treatment using the treatment instrument 301 (control at treatment). After completing the control at treatment, the processing of the CPU 326 proceeds to Step S5 in FIG. 10. The control at treatment will be described later.

In Step S109, the CPU 326 determines whether a time for driving the treatment instrument 301 has timed out. Specifically, the CPU 326 determines whether a preset waiting time has elapsed since the final operation time of the treatment instrument 301. If the CPU 326 determines that the waiting time has elapsed (Step S109: Yes), then the processing proceeds to Step S110. On the other hand, if the CPU 326 does not determine that the waiting time has elapsed (Step S109: No), then the processing proceeds to Step S111.

In Step S110, the CPU 326 sets the operation mode of the treatment instrument 301 to a standby mode. At this time, in the standby mode, the treatment instrument 301 is in the energized state, but is in a state of reducing power consumption in which operation processing such as ultrasonic output is not executed.

In Step S111, the CPU 326 determines whether the treatment instrument 301 has been removed from the treatment instrument controller 302. For example, the CPU 326 determines whether the treatment instrument 301 has been removed from the treatment instrument controller 302 based on a signal from the treatment instrument controller 302. If the CPU 326 determines that the treatment instrument 301 has been removed from the treatment instrument controller 302 (Step S111: Yes), then the processing proceeds to Step S5 in FIG. 10. On the other hand, if the CPU 326 does not determine that the treatment instrument 301 has been removed from the treatment instrument controller 302 (Step S111: No), then the processing proceeds to Step S103.

Figure 12:
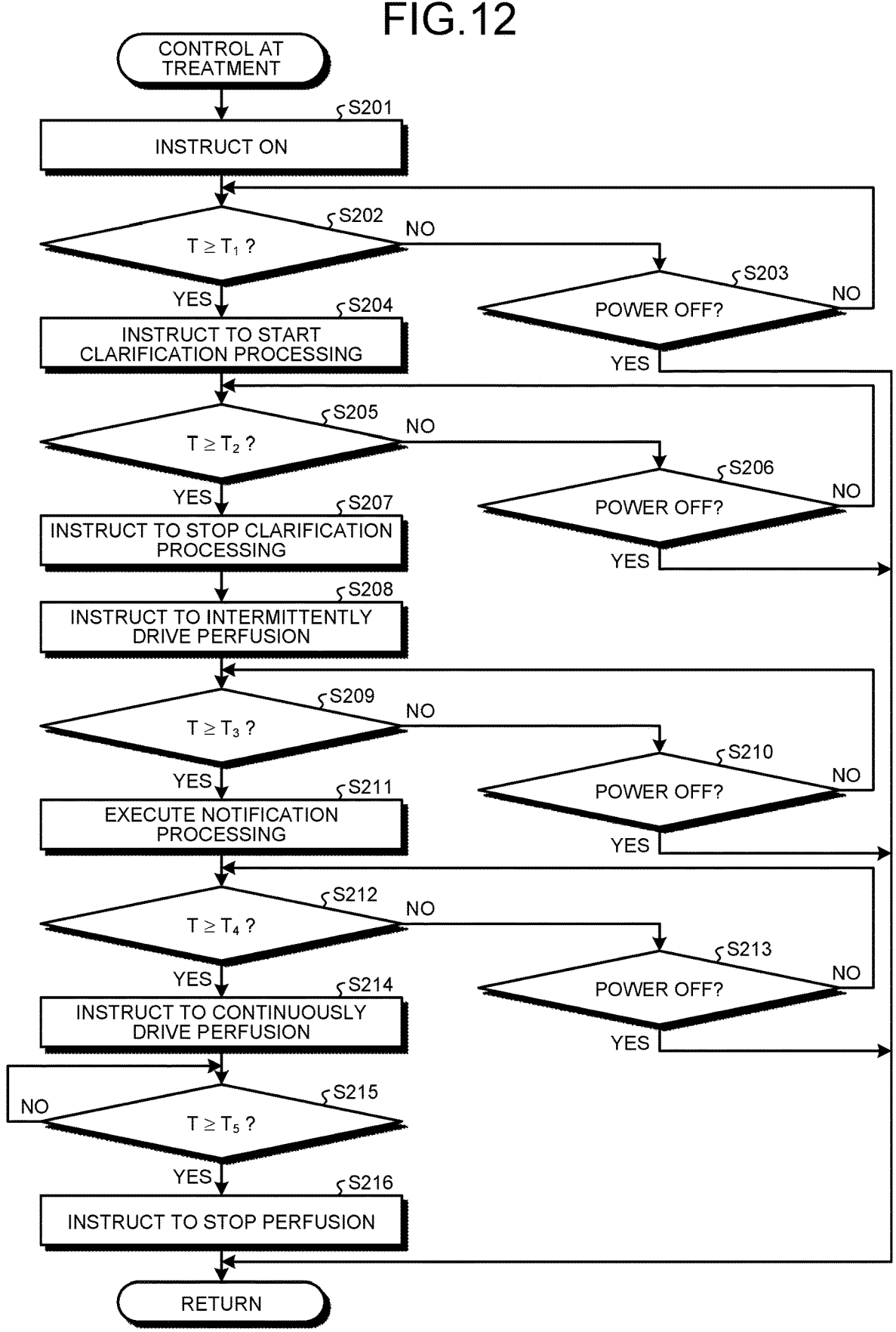
FIG. 12 is a flowchart illustrating an outline of control at treatment in the treatment system according to an embodiment.
Figure 13:
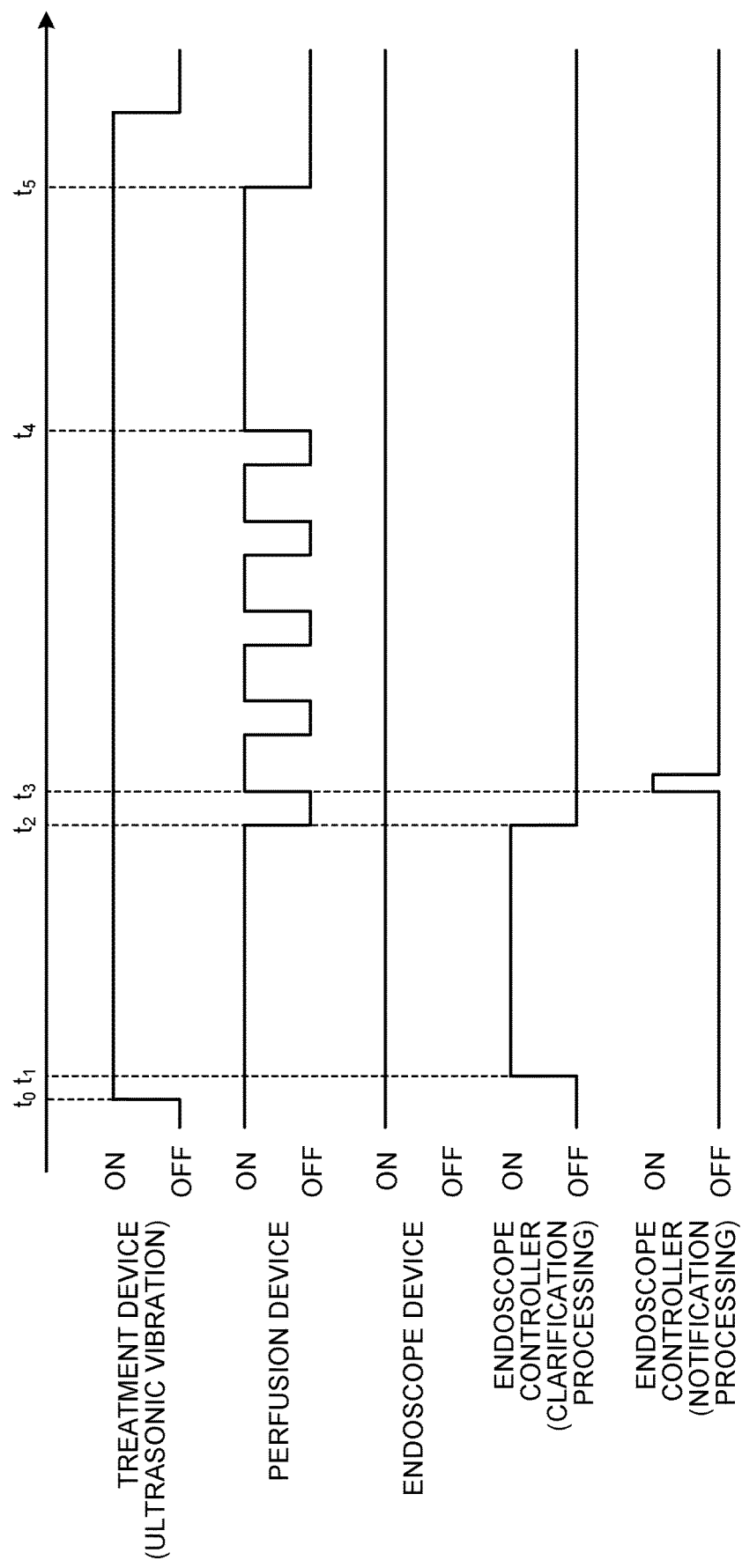
FIG. 13 is a time chart illustrating an outline of control at treatment in the treatment system according to an embodiment.

Next, a flow of the control at treatment will be described. FIG. 12 is a flowchart illustrating the outline of the control at treatment in the treatment system according to the present embodiment. FIG. 13 is a time chart illustrating the outline of the control at treatment in the treatment system according to the present embodiment.

When a signal for starting ultrasonic vibration is input via the input/output unit 304 and the like, the CPU 326 outputs an instruction to turn on the ultrasonic vibration to the treatment instrument 301. At this time, in the treatment instrument 301, frequency scanning is executed before the ultrasonic vibration (Step S201). In the frequency scanning, a predetermined frequency is output as an operation before the treatment instrument 301 is driven, and processing of adjusting a resonance frequency is executed. In addition, a time at which the ultrasonic vibration of the treatment instrument 301 is started after execution of the frequency scanning is defined as to (see FIG. 13). Hereinafter, an elapsed time from time to is defined as T.

Thereafter, the CPU 326 determines whether the elapsed time T is longer than a preset elapsed time $T_1$ (Step S202). If the CPU 326 determines that the elapsed time T is equal to or less than the elapsed time $T_1$ (Step S202: No), then the processing proceeds to Step S203. On the other hand, if the CPU 326 determines that the elapsed time T is longer than the elapsed time $T_1$ (this time is set as $t_1$) (Step S202: Yes), then the processing proceeds to Step S204.

In Step S203, the CPU 326 determines whether the treatment instrument 301 is powered off. If the CPU 326 detects the energization state of the treatment instrument 301 via the treatment instrument controller 302 and determines that the treatment instrument 301 is powered off (Step S203: Yes), then the processing proceeds to Step S5 in FIG. 10. On the other hand, if the CPU 326 does not determine that the treatment instrument 301 is powered off (Step S203: No), then the processing proceeds to Step S202.

Further, in Step S204, the CPU 326 instructs the endoscope controller 202 to start clarification processing on an image displayed on the display 203 (see FIG. 13). In the present embodiment, in the clarification processing, the second image processing circuit 222b of the endoscope controller 202 acquires a turbidity detection result from the turbidity detector 223, and superimposes an image in which the edge of the treatment instrument 301 and the living tissue is enhanced on an endoscopic image output to the display 203 according to the degree of the turbidity. The second image processing circuit 222b executes known contour extraction processing such as edge extraction on the endoscopic image, generates a superimposed image in which the extracted contour is enhanced, and superimposes the resultant superimposed image on the endoscopic image. At this time, it is determined whether to execute enhancement processing according to the degree of the turbidity, or the enhancement degree (for example, the density of the superimposed image) is set according to the degree of the turbidity. The CPU 227 of the endoscope controller 202 causes the display 203 to display the image generated by the second image processing circuit 222b.

Incidentally, the second image processing circuit 222b may execute the contour extraction processing on an image obtained by illumination with special light.

Figure 14:
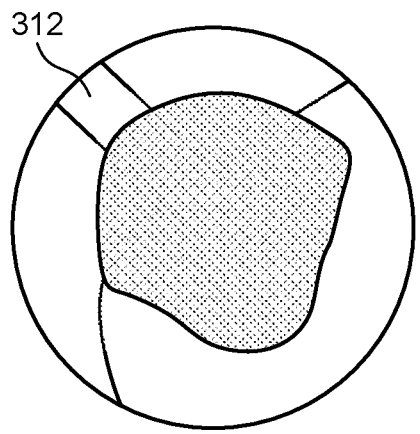
FIG. 14 is a diagram (No. 1) for explaining an example of clarification processing in the treatment system according to an embodiment.
Figure 15:
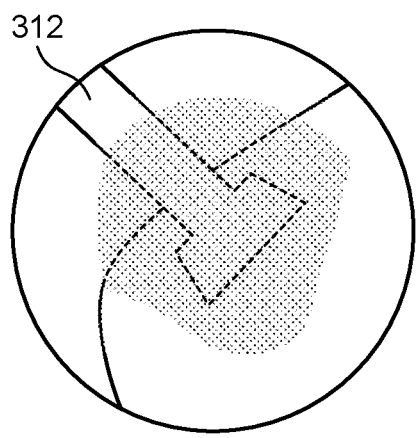
FIG. 15 is a diagram (No. 2) for explaining an example of clarification processing in the treatment system according to an embodiment.

FIGS. 14 and 15 are diagrams for explaining an example of the clarification processing in the treatment system according to the present embodiment. The image illustrated in FIG. 14 is an endoscopic image including the distal end of the ultrasound probe 312, for example. The CPU 227 extracts the contour of the ultrasound probe 312 by the edge extraction from the ultrasound probe 312 (see FIG. 14) in a turbid liquid. The CPU 227 generates an image in which the contour of the ultrasound probe 312 is visually enhanced by performing the enhancement processing on the luminance change of the extracted contour portion or the like (see FIG. 15). As described above, even when turbidity occurs, with the enhanced image, the ultrasound probe 312 can be visually recognized.

Thereafter, the CPU 326 determines whether the elapsed time T is longer than a preset elapsed time $T_2$ ($>T_1$) (Step S205). If the CPU 326 determines that the elapsed time T is equal to or less than the elapsed time $T_2$ (Step S205: No), then the processing proceeds to Step S206. On the other hand, if the CPU 326 determines that the elapsed time T is longer than the elapsed time $T_2$ (this time is set as $t_2$) (Step S205: Yes), then the processing proceeds to Step S207.

In Step S206, the CPU 326 determines whether the treatment instrument 301 is powered off. If the CPU 326 detects the energization state of the treatment instrument 301 and determines that the treatment instrument 301 is powered off (Step S206: Yes), then the processing proceeds to Step S5 in FIG. 10. On the other hand, if the CPU 326 does not determine that the treatment instrument 301 is powered off (Step S206: No), then the processing proceeds to Step S205.

Further, in Step S207, the CPU 326 instructs the endoscope controller 202 to stop the clarification processing in the image processing unit 222 (see FIG. 13).

Then, the CPU 326 instructs the perfusion device 5 to intermittently drive the pump 5c (Step S208). The CPU 510 of the perfusion device 5 intermittently drives the pump 5c. The perfusion device 5 therefore intermittently releases the perfusate.

Thereafter, the CPU 326 determines whether the elapsed time T is longer than a preset elapsed time $T_3$ ($>T_2$) (Step S209). If the CPU 326 determines that the elapsed time T is equal to or less than the elapsed time $T_3$ (Step S209: No), then the processing proceeds to Step S210. On the other hand, if the CPU 326 determines that the elapsed time T is longer than the elapsed time $T_3$ (this time is set as t 3) (Step S209: Yes), then the processing proceeds to Step S211.

In Step S210, the CPU 326 determines whether the treatment instrument 301 is powered off. If the CPU 326 detects the energization state of the treatment instrument 301 and determines that the treatment instrument 301 is powered off (Step S210: Yes), then the processing proceeds to Step S5 in FIG. 10. On the other hand, if the CPU 326 does not determine that the treatment instrument 301 is powered off (Step S210: No), then the processing proceeds to Step S209.

In addition, in Step S211, the CPU 326 executes communication for instructing the endoscope controller 202 to perform notification processing to the effect that the perfusion has been switched to be released intermittently. For example, the CPU 227 of the endoscope controller 202 causes the display 203 to display information indicating that the perfusate has been switched to be released intermittently.

Thereafter, the CPU 326 determines whether the elapsed time T is longer than a preset elapsed time $T_4$ ($>T_3$) (Step S212). If the CPU 326 determines that the elapsed time T is equal to or less than the elapsed time $T_4$ (Step S212: No), then the processing proceeds to Step S213. On the other hand, if the CPU 326 determines that the elapsed time T is longer than the elapsed time $T_4$ (this time is set as t 4) (Step S212: Yes), then the processing proceeds to Step S214.

In Step S213, the CPU 326 determines whether the treatment instrument 301 is powered off. If the CPU 326 detects the energization state of the treatment instrument 301 and determines that the treatment instrument 301 is powered off (Step S213: Yes), then the processing proceeds to Step S5 in FIG. 10. On the other hand, if the CPU 326 does not determine that the treatment instrument 301 is powered off (Step S213: No), then the processing proceeds to Step S212.

Further, in Step S214, the CPU 326 instructs the perfusion device 5 to continuously drive the pump 5c. The CPU 510 of the perfusion device 5 drives the pump 5c to continuously release the perfusate to the perfusion device (see FIG. 13).

Thereafter, the CPU 326 determines whether the elapsed time T is longer than a preset elapsed time $T_5$ ($>T_4$) (Step S215). If the CPU 326 determines that the elapsed time T is equal to or less than the elapsed time $T_5$ (Step S215: No), then the CPU 326 repeatedly checks the elapsed time. On the other hand, if the CPU 326 determines that the elapsed time T is longer than the elapsed time $T_5$ (this time is set as t 5) (Step S215: Yes), then the processing proceeds to Step S216.

Further, in Step S216, the CPU 326 instructs the perfusion device 5 to stop driving the pump 5c. The CPU 510 of the perfusion device 5 drives the pump 5c to continuously release the perfusate to the perfusion device After that, the processing of the CPU 326 proceeds to Step S5 in FIG. 10.

Figure 16:
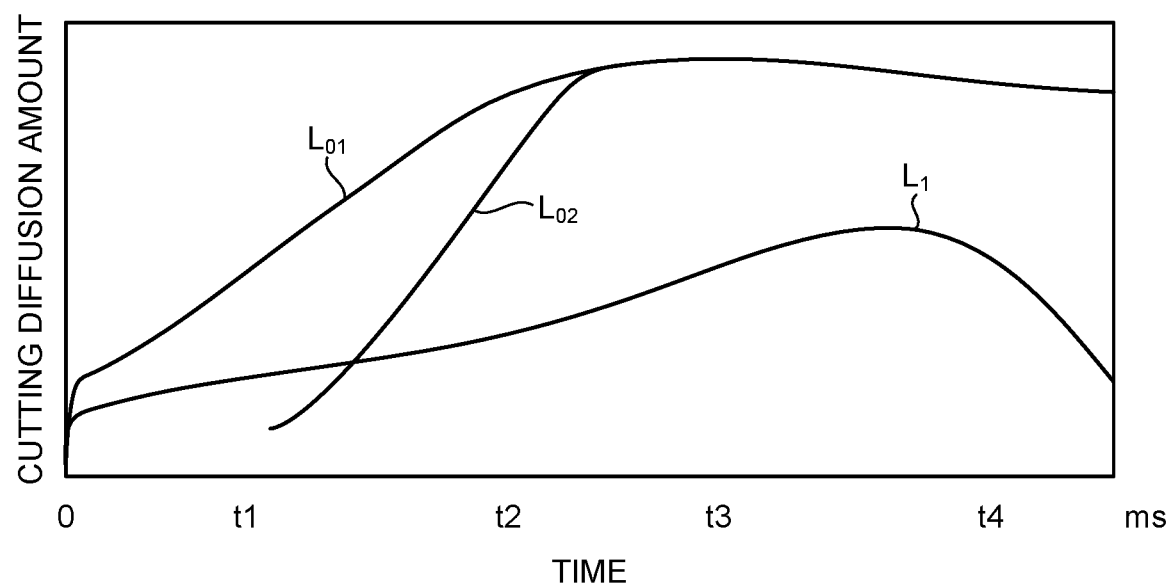
FIG. 16 is a diagram for explaining a cutting diffusion amount at the time of control at treatment in the treatment system according to an embodiment.

FIG. 16 is a diagram for explaining a cutting diffusion amount at the time of the control at treatment in the treatment system according to the present embodiment. In FIG. 16, a curve $L_1$ indicates a cutting diffusion amount for a case where the control at treatment described above has been executed. A curve $L_{O1}$ indicates a cutting diffusion amount for a case where control such as the perfusate and the image processing (clarification processing) has not been executed. A curve $L_{O2}$ indicates a cutting diffusion amount for a case where only the image processing (clarification processing) has been executed. In the curves $L_{O1}$ and $L_{O2}$, the cutting diffusion amount increases with time. On the other hand, in the curve $L_1$, as compared with the curves $L_{O1}$ and $L_{O2}$, increase in the cutting diffusion amount is suppressed, and the cutting diffusion amount proportional to the degree of cloudiness of the image is reduced.

In the embodiment described above, as the state of the treatment instrument 301, it is detected whether preparation for starting the treatment is made, and in a case where it is determined that the preparation is made (preparation completed), the perfusate is released prior to the start of use of the treatment instrument 301, or processing for preventing poor visibility of a treatment area due to turbidity (here, the contour enhancement processing) is executed. For example, the treatment area may include one or more of: the living tissue, the treatment instrument, such as a distal end of the treatment instrument, and a vicinity of the treatment instrument or distal end thereof. In other words, control for preventing or suppressing the reduction in visibility of the treatment area by bone powder or the like generated by the treatment is performed prior to the start of use of the treatment instrument 301. According to the above embodiment, the state immediately before the treatment is detected and controlled, which makes it possible to suppress the influence on the surgery caused by turbidity in the perfusate.

Note that, in the above embodiment, the contour enhancement processing is executed as the image clarification processing, but the disclosure is not limited thereto. For example, the driving power for the treatment instrument 301 may be reduced to lower the cutting strength and the amount of generated bone powder may be suppressed to reduce cloudiness, or the driving power for the treatment instrument 301 may be increased to increase the cutting strength and the time required for cutting may be shortened to reduce white turbidity. Alternatively, the treatment instrument 301 may be intermittently vibrated to suppress the amount of bone powder generated to reduce white turbidity. Alternatively, the amount of perfusate supplied or suctioned by the perfusion device 5 may be adjusted. For example, the supply amount of the perfusate is increased to promote the dispersion of bone powder, or the suction amount of the perfusate is further increased to promote the discharge of bone powder. In addition, these clarification processing may be combined.

The above embodiment can be modified as described below. In the above embodiment, the example in which the detection result of the posture detector 314 is used as the cutting preparation detection for the treatment instrument 301 has been described, but in the present modification, an example in which an endoscopic image acquired by the endoscope 201 is used will be described. Since the configuration of the treatment system 1 is similar to that of the above embodiment, the description thereof will be omitted.

Also in the modification, the processing is executed according to the flowcharts illustrated in FIGS. 10 to 12. Here, in the modification, in Step S103, the CPU 227 of the endoscope controller 202 instructs the endoscope controller 202 from the treatment instrument controller 302 to execute cutting preparation determination using an endoscopic image.

Specifically, the CPU 227 of the endoscope controller 202 reads two endoscopic images generated by the image processing unit 222 and having different image-capturing times (Step S103). Then, the CPU 227 calculates a movement amount of the subject in a region of interest of the endoscopic images.

Figure 17:
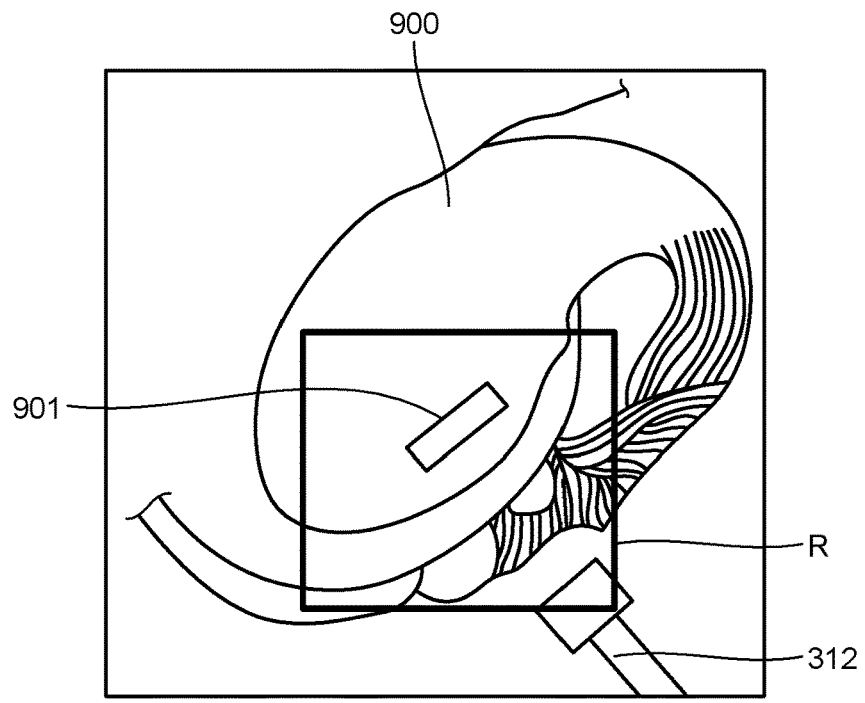
FIG. 17 is a diagram (No. 1) for explaining movement amount calculation in a treatment system according to an embodiment.
Figure 18:
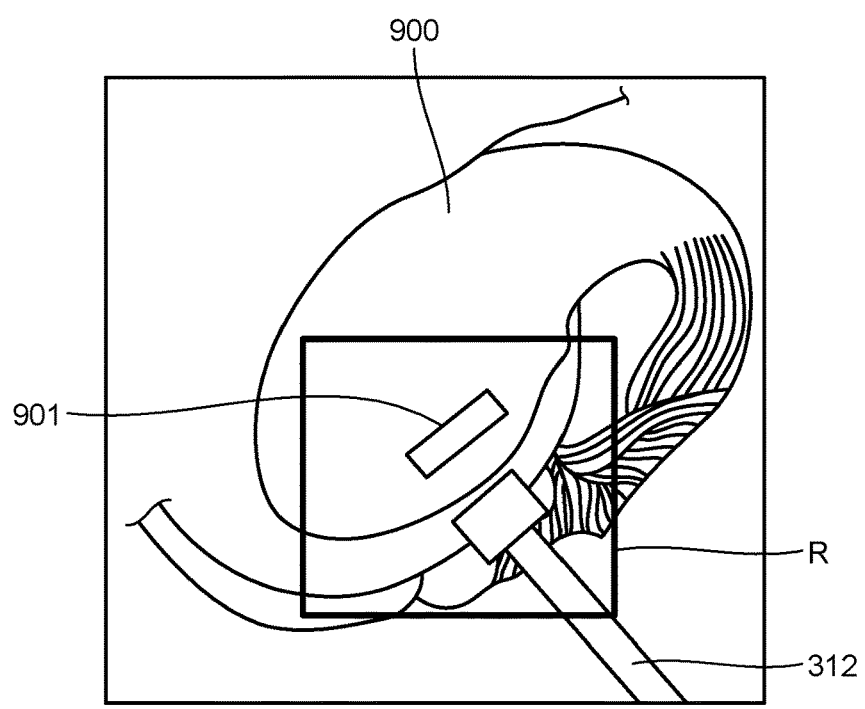
FIG. 18 is a diagram (No. 2) for explaining movement amount calculation in the treatment system according to an embodiment.

FIGS. 17 and 18 are diagrams for explaining movement amount calculation in the treatment system according to the modification to the above embodiment. The images illustrated in FIGS. 17 and 18 each illustrate, for example, an endoscopic image including the distal end of the ultrasound probe 312, and have image-capturing times (frames) different from each other. The CPU 227 calculates a movement amount of the subject in a region of interest (region R illustrated in FIG. 17, for example) of the endoscopic image. The CPU 227 detects the ultrasound probe 312 appearing in the region R from each image, and calculates, as the movement amount, the corresponding position of the ultrasound probe 312 with respect to a treatment section 901 and the movement amount in the screen.

Thereafter, the CPU 227 determines whether the calculated movement amount is equal to or greater than a preset threshold. If the movement amount is equal to or greater than the threshold, then the CPU 227 determines that preparation for cutting has not been made yet. On the other hand, if the movement amount is smaller than the threshold, then the CPU 227 determines that the preparation for cutting has been made (cutting preparation completed). Then, the CPU 227 transmits the movement determination result as the preparation information to the treatment instrument controller 302.

The CPU 326 of the treatment instrument controller 302 determines whether preparation for cutting is made based on the read preparation information (Step S104).

Processing other than the cutting preparation determination is the same as that in the above embodiment.

In the modification described above, similarly to the above embodiment, the state of the treatment instrument 301, it is detected whether preparation for starting the treatment is made, and in a case where it is determined that the preparation is made (preparation completed), the perfusate is released prior to the start of use of the treatment instrument 301, or processing for preventing poor visibility of the treatment area due to turbidity is executed. In other words, control for preventing or suppressing the reduction in visibility of the treatment area by bone powder or the like generated by the treatment is performed prior to the start of use of the treatment instrument 301. According to the modification, the state immediately before the treatment is detected and controlled, which makes it possible to suppress the influence on the surgery caused by turbidity in the perfusate.

Further, in the modification, since the preparation state for the treatment is determined according to the movement of the subject in the endoscopic image, it is possible to accurately grasp the movement of the treatment instrument 301 to execute the control.

In the modification, the example of calculating the movement amount of the subject in the region of interest has been described. However, the movement amount of the subject may be calculated for the entire image, or the movement amount of the treatment instrument extracted in the contour extraction may be calculated.

Figure 19:
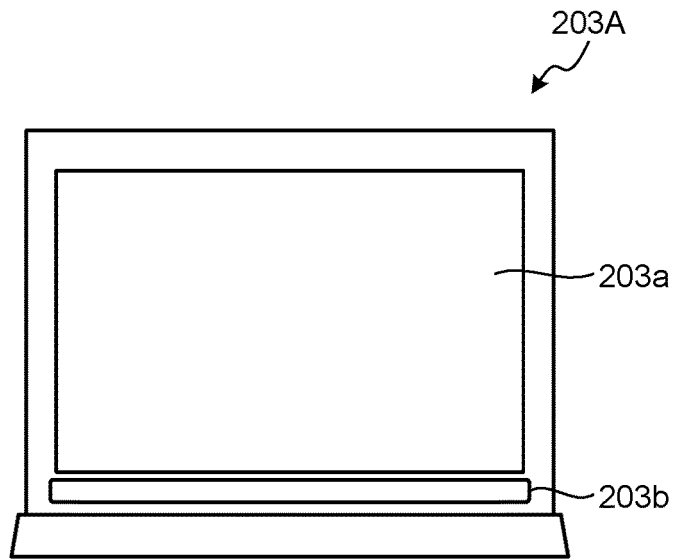
FIG. 19 is a diagram illustrating a configuration of a monitor in a treatment system according to an embodiment.
Figure 20:
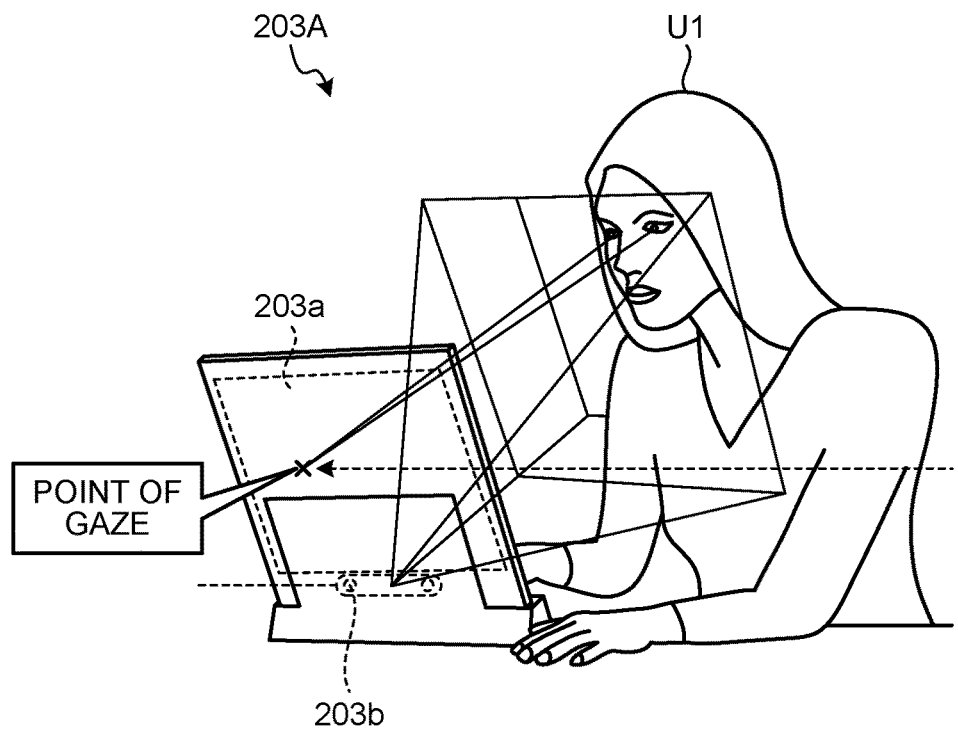
FIG. 20 is a diagram for explaining an outline for a case where a monitor of the treatment system according to an embodiment is used.

The description goes on to describe another exemplary embodiment with reference to FIGS. 19 and 20. In the above embodiment, the example in which the detection result of the posture detector 314 provided in the treatment instrument 301 is used as the cutting preparation detection for the treatment instrument 301 has been described, but in the present embodiment, an example in which a detection result of a line-of-sight of a user is used will be described. A treatment system according to the present embodiment includes a display 203A instead of the display 203 of the treatment system 1 according to the above embodiment. Since the other configurations are similar to those of the above embodiment, the description thereof will be omitted.

The display 203A includes a display unit 203*a* and a line-of-sight detector 203*b*. The display unit 203*a* is configured using a liquid crystal display panel or an organic EL display panel, and receives, via the endoscope controller, data, image data, audio data, and the like transmitted from each device of the treatment system, and displays/notifies the received data.

The line-of-sight detector 203*b* includes an LED light source that emits near-infrared rays, an optical sensor (for example, CMOS, CCD, and the like) that captures images of a pupil point and a reflection point on the cornea, and a control unit that controls each unit. The line-of-sight detector 203*b* is provided on a side surface of a casing of the display 203A, for example, below the display unit 203*a*, where a user U1 can visually recognize the display unit 203*a*.

The line-of-sight detector 203*b* generates line-of-sight data obtained by detecting the line-of-sight of the user U1 with respect to the display unit 203*a*, and outputs the line-of-sight data to the endoscope controller 202. Specifically, the line-of-sight detector 203*b* irradiates the cornea of the user U1 with near-infrared light from the LED light source or the like, and the optical sensor captures images of a pupil point and a reflection point on the cornea of the user U1 to thereby generate line-of-sight data. Then, the line-of-sight detector 203*b* calculates a continuous movement of the line-of-sight of the user from the pattern of the pupil point and the reflection point of the user U1 based on the analysis result obtained by analyzing data at predetermined time intervals generated by the optical sensor by image processing or the like. The continuous movement herein is expressed by a set of a plurality of points of gaze at each analysis time.

Note that the line-of-sight detector 203*b* may generate line-of-sight data in which the line-of-sight of the user U1 is detected by detecting the pupil of the user U1 with only the optical sensor using known pattern matching, or may generate line-of-sight data by detecting the line-of-sight of the user U1 using another sensor or another known technique.

In the present embodiment, the processing is executed according to the flowcharts illustrated in FIGS. 10 to 12. Here, in the present embodiment, in Step S103, the CPU 227 of the endoscope controller 202 executes the cutting preparation determination using the line-of-sight data. Specifically, the CPU 227 reads line-of-sight data having analysis times different from each other. Then, the CPU 227 determines whether the distribution of the plurality of points of gaze constituted by the line-of-sight data is equal to or greater than a preset range. The distribution is, for example, a diameter of the smallest circle among circles including all the points of gaze, and the range is a diameter of a circle of the distribution for which a determination that the treatment instrument 301 is stationary is made.

If the distribution is equal to or greater than the range, then the CPU 227 determines that the preparation for cutting has not been made. On the other hand, if the distribution is smaller than the range, then the CPU 227 determines that the preparation for cutting has been made (cutting preparation completed). Then, the CPU 227 transmits the movement determination result as the preparation information to the treatment instrument controller 302. The CPU 326 of the treatment instrument controller 302 determines whether preparation for cutting is made based on the read preparation information (Step S104).

Processing other than the cutting preparation determination is the same as that in the above embodiment.

In the present embodiment, similarly to the above embodiment, the state of the treatment instrument 301, it is detected whether preparation for starting the treatment is made, and in a case where it is determined that the preparation is made (preparation completed), the perfusate is released prior to the start of use of the treatment instrument 301, or processing for preventing poor visibility of the treatment area due to turbidity is executed. In other words, control for preventing or suppressing the reduction in visibility by bone powder or the like generated by the treatment is performed prior to the start of use of the treatment instrument 301. According to the present embodiment, the state immediately before the treatment is detected and controlled, which makes it possible to suppress the influence on the surgery caused by turbidity in the perfusate.

In the present embodiment, the preparation state for the treatment is determined according to the detection result of the line-of-sight of the user, so that control reflecting the intention of the user can be executed.

Figure 21A:
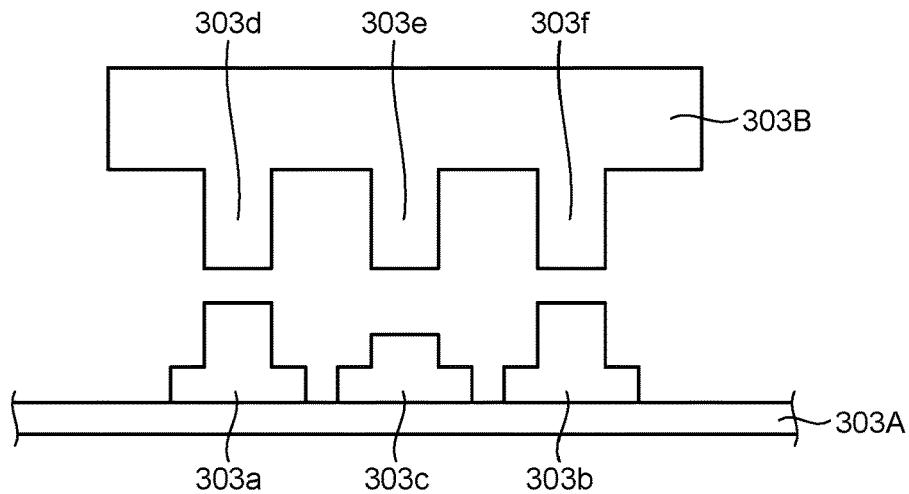
FIG. 21A is a diagram (No. 1) illustrating a configuration of a foot switch in a treatment system according to an embodiment.
Figure 21B:
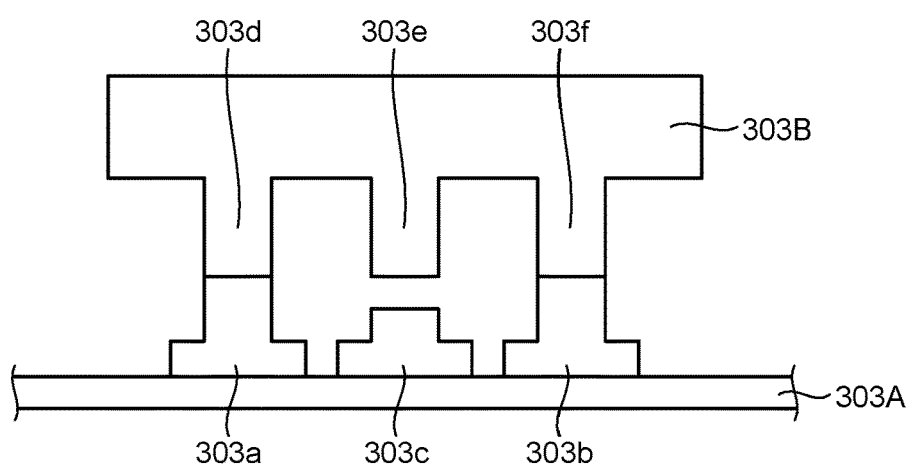
FIG. 21B is a diagram (No. 2) illustrating a configuration of a foot switch in the treatment system according to an embodiment.
Figure 21C:
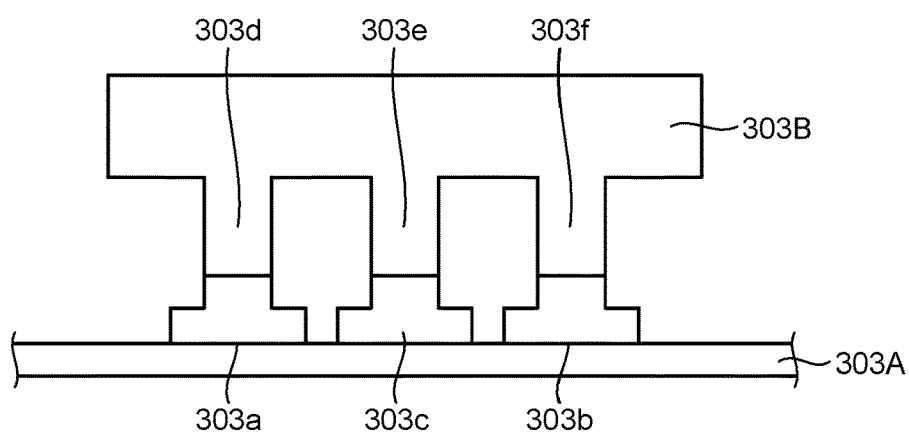
FIG. 21C is a diagram (No. 3) illustrating a configuration of a foot switch in the treatment system according to an embodiment.

The description goes on to describe another exemplary embodiment with reference to FIGS. 21A to 21C.

In the first embodiment shown in, for example, FIGS. 1-16, the example in which the detection result of the posture detector 314 is used as the cutting preparation detection for the treatment instrument 301 has been described, but in the present embodiment, an example in which an input mode from the foot switch 303 is used will be described. Since the configuration of the treatment system 1 is similar to that of the first embodiment except for the configuration of the foot switch 303, the description thereof will be omitted.

In the present embodiment, the foot switch 303 is an input interface for the surgeon to operate with his/her foot when the surgeon drives the ultrasound probe 312. The foot switch 303 includes a base section 303A and a foot button 303B. The base section 303A is provided with three buttons to be pressed (buttons to be pressed 303*a* to 303*c*). The foot button 303B is also provided with three pushing buttons (pushing buttons 303*d* to 303*f*) that respectively come into contact with the buttons to be pressed 303*a* to 303*c* to form respective sets. In the present embodiment, the buttons to be pressed 303*a* and 303*b* are different from the button to be pressed 303*c* in height. On the other hand, the pushing buttons 303*d* to 303*f* have the same length extending from the bottom surface of the foot button 303B. Accordingly, when the user pushes the foot button 303B, the buttons to be pressed 303*a* and 303*b* come into contact with the pushing buttons 303*d* and 303*f* (see FIG. 21B), and when the user further pushes the foot button 303B, the button to be pressed 303*c* comes into contact with the pushing button 303*e* (see FIG. 21C). The foot switch 303 outputs, to the treatment instrument controller 302, a signal corresponding to a contact state between the buttons to be pressed and the pushing buttons. In the present embodiment, a first signal indicative of cutting preparation completed is output in a state where only the buttons to be pressed 303a and 303b are in contact with the pushing buttons 303d and 303f, and a second signal indicating that ultrasonic vibration is performed is output in a state where all the buttons to be pressed are in contact with the pushing buttons.

In the present embodiment, an example in which the foot switch 303 can be pushed in two stages is described, but a configuration may be employed in which the foot switch is pushed in multiple stages of three or more stages, and different signals are output in each stage.

Also in the present embodiment, the processing is executed according to the flowcharts illustrated in FIGS. 10 to 12. Here, in the present embodiment, in Steps S103 and S104, the CPU 326 executes the cutting preparation determination using the foot switch 303. Specifically, the CPU 326 reads information on whether a signal is input from the foot switch 303 (Step S103).

Then, in a case where a signal is acquired, the CPU 326 determines whether the signal is the first signal (Step S104). In a case where no signal is acquired from the foot switch 303 or the second signal is acquired, the CPU 326 determines that the preparation for performing the cutting preparation is not made (Step S104: No), and the processing returns to Step S103 to read new preparation information. On the other hand, in a case where the first signal is acquired from the foot switch 303, the CPU 326 determines that the cutting preparation has been made (cutting preparation completed) (Step S104: Yes), and the processing proceeds to Step S105.

Processing other than the cutting preparation determination is the same as that in the first embodiment described above with respect to FIGS. 1-16.

In the present embodiment, similarly to the first embodiment, the state of the treatment instrument 301, it is detected whether preparation for starting the treatment is made, and in a case where it is determined that the preparation is made (preparation completed), the perfusate is released prior to the start of use of the treatment instrument 301, or processing for preventing poor visibility of the treatment area due to turbidity is executed. In other words, control for preventing or suppressing the reduction in visibility of the treatment area by bone powder or the like generated by the treatment is performed prior to the start of use of the treatment instrument 301. According to the present embodiment, the state immediately before the treatment is detected and controlled, which makes it possible to suppress the influence on the surgery caused by turbidity in the perfusate.

OTHER EMBODIMENTS

Various embodiments can be made by appropriately combining the plurality of constituent elements disclosed in the embodiments described above. For example, some constituent elements may be deleted from all the constituent elements described in the above embodiments.

Further, in the above embodiments, the configuration in which the control unit that controls each device such as the endoscope 201 and the treatment instrument 301 is individually provided as the controller has been described, but a configuration in which one control unit (controller) collectively controls each device may be adopted.

In addition, the above-described "device", "unit", and "circuit" in the above embodiments can be read as "means", "circuitry", "section", or the like. For example, the control unit can be read as a control section or a control circuit.

In addition, the program to be executed by each device according to the above embodiments is provided by being recorded as file data in an installable format or an executable format in a computer-readable recording medium such as a CD-ROM, a flexible disk (FD), a CD-R, a digital versatile disk (DVD), a USB medium, or a flash memory.

The program to be executed by each device according to the above embodiments may be stored in a computer connected to a network such as the Internet and provided by being downloaded via the network. Further, the program to be executed by each device according to the above embodiments may be provided or distributed via a network such as the Internet.

Further, in the above embodiments, signals are transmitted and received by wireless communication. However, for example, wireless communication is not necessary, and a wired communication in which signals are transmitted and received from various devices via a transmission cable may be used.

Note that, in the description of the flowcharts in the present specification, the order of processing necessary for carrying out the disclosure is not uniquely determined by the expression illustrated in the flowcharts. That is, the order of processing in the flowcharts described in the present specification can be changed to the extent that it is consistent.

Although some of the embodiments of the present application have been described in detail with reference to the drawings, these are merely examples, and the disclosure can be implemented in other forms subjected to various modifications and improvements based on the knowledge of those skilled in the art, including the aspects described in the disclosure.

As described above, the treatment system, the control device, and the method of operating the treatment system according to the disclosure are useful for suppressing the influence on the surgery caused by the turbidity in the perfusate.

According to the disclosure, it is possible to reduce the influence on surgery due to turbidity in a perfusate.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A treatment system comprising: a treatment instrument extending in a longitudinal axis direction, the treatment instrument being configured to cut living tissue in a liquid; a controller configured to perform control, prior to cutting the living tissue with the treatment instrument, to suppress reduced visibility of a treatment area due to turbidity in the liquid caused by the cutting of the living tissue based on preparation information regarding cutting preparation for the treatment instrument; and wherein the treatment instrument includes a sensor configured to detect movement in three axial directions and rotation around each axis, the three axial directions being orthogonal to one another and including an axis parallel to the longitudinal axis, and the controller is configured to acquire, as the preparation information, information regarding the movement in each of the three axial directions and the rotation detected by the sensor.

2. The treatment system according to claim 1, wherein the controller is configured to acquire the preparation information.

3. The treatment system according to claim 1, wherein the controller is configured to calculate a movement amount of the treatment instrument based on the information regarding the movement and the rotation and perform the control to suppress reduced visibility of the treatment area based on the calculated movement amount.

4. The treatment system according to claim 2, further comprising
an imager configured to capture an image of the treatment instrument and a vicinity of the treatment instrument, wherein
the controller is configured to acquire, as the preparation information, image data on the living tissue and a vicinity of a distal end of the treatment instrument captured by the imager.

5. The treatment system according to claim 4, wherein
the controller is configured to calculate a movement amount of the treatment instrument based on the image data to perform the control to suppress reduced visibility of the treatment area based on the calculated movement amount.

6. The treatment system according to claim 2 further comprising:
a display configured to display an image of the treatment instrument and a vicinity of the treatment instrument; and
a line-of-sight detector configured to detect a line-of-sight of a user of the treatment instrument with respect to the display, wherein
the controller is configured to acquire, as the preparation information, line-of-sight information regarding the line-of-sight of the user detected by the line-of-sight detector.

7. The treatment system according to claim 6, wherein
the controller is configured to calculate a movement amount of the treatment instrument based on the line-of-sight information to perform the control to suppress reduced visibility of the treatment area based on the calculated movement amount.

8. The treatment system according to claim 7, further comprising
a foot switch configured to be pushed in at least two stages and output a signal different in each of the at least two stages, wherein
the controller is configured to acquire, as the preparation information, the signal output from the foot switch.

9. The treatment system according to claim 8, wherein
the controller is configured to perform the control to suppress reduced visibility of the treatment area based on the signal output from the foot switch.

10. The treatment system according to claim 1, further comprising:
an imager configured to capture an image of the treatment instrument and a vicinity of the treatment instrument;
an endoscope controller configured to process the image captured by the imager; and
a display configured to display the image processed by the endoscope controller, wherein
the controller is configured to perform control to reduce deterioration of a display image to be displayed on the display as the control to suppress reduced visibility of the treatment area.

11. The treatment system according to claim 10, wherein
the controller is configured to perform control to enhance an edge of a subject in the image captured by the imager as the control to reduce deterioration of the display image.

12. The treatment system according to claim 1, further comprising
a treatment instrument controller configured to control an operation of the treatment instrument, wherein
the controller is configured to perform control to reduce the turbidity in the liquid as the control to suppress reduced visibility of the treatment area.

13. The treatment system according to claim 12, wherein
the controller is configured to perform control to reduce driving power for the treatment instrument as the control to reduce the turbidity in the liquid.

14. The treatment system according to claim 12, wherein
the controller is configured to perform control to increase driving power for the treatment instrument as the control to reduce the turbidity in the liquid.

15. The treatment system according to claim 1, further comprising
a perfusion device configured to control perfusion of the liquid, wherein
the controller is configured to perform control to adjust perfusion of the liquid by the perfusion device to reduce the turbidity in the liquid as the control to suppress reduced visibility of the treatment area.

16. The treatment system according to claim 15, wherein
the controller is configured to perform control to increase a supply speed of the liquid as the control to reduce the turbidity in the liquid.

17. The treatment system according to claim 16, wherein
the perfusion device is configured to suction the liquid, and
the controller is configured to perform control to increase a suction amount of the liquid.

18. The treatment system according to claim 1, wherein
the treatment instrument is an ultrasound treatment instrument.

19. The treatment system according to claim 1, wherein
the turbidity in the liquid is caused by bone powder generated when a bone is cut by hammering with ultrasonic vibration.

20. The treatment system according to claim 1, wherein the turbidity in the liquid is due to white particles.

21. A control device comprising a controller configured to, prior to cutting living tissue in a liquid using a treatment instrument that extends in a longitudinal axis direction, perform control to suppress reduced visibility of a treatment area due to turbidity in the liquid caused by the cutting of the living tissue based on preparation information regarding cutting preparation for the treatment instrument; and wherein the treatment instrument includes a sensor configured to detect movement in three axial directions and rotation around each axis, the three axial directions being orthogonal to one another and including an axis parallel to the longitudinal axis, and the controller is configured to acquire, as the preparation information, information regarding the movement in each of the three axial directions and the rotation detected by the sensor.

22. A method of operating a treatment system, the treatment system including a treatment instrument and a controller, the treatment instrument extending in a longitudinal axis direction, the treatment instrument being configured to cut living tissue in a liquid, the method comprising: performing control, by the controller, prior to cutting the living tissue with the treatment instrument, to suppress reduced visibility of a treatment area due to turbidity in the liquid caused by the cutting of the living tissue based on preparation information regarding cutting preparation for the treatment instrument; and wherein the treatment instrument includes a sensor configured to detect movement in three axial directions and rotation around each axis, the three axial directions being orthogonal to one another and including an axis parallel to the longitudinal axis, and the controller is configured to acquire, as the preparation information, information regarding the movement in each of the three axial directions and the rotation detected by the sensor.

\* \* \* \* \*